United States Patent
Ciprian et al.

(10) Patent No.: US 6,317,683 B1
(45) Date of Patent: *Nov. 13, 2001

(54) VEHICLE POSITIONING USING THREE METRICS

(75) Inventors: Joseph Ciprian, Bloomingdale; Bishnu P. Phuyal, Des Plaines; Robert Fernekes, McHenry; David S. Lampert, Highland Park, all of IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/680,162

(22) Filed: Oct. 5, 2000

(51) Int. Cl.$^7$ .................................................. G06F 165/00
(52) U.S. Cl. ........................... 701/118; 701/200; 701/207
(58) Field of Search .................................. 701/207, 200, 701/118, 208, 209, 210; 340/988

(56) References Cited

U.S. PATENT DOCUMENTS

| | | | |
|---|---|---|---|
| 4,796,191 | 1/1989 | Honey et al. | 701/217 |
| 4,807,128 | 2/1989 | Tehmoku et al. | 701/207 |
| 4,814,989 | 3/1989 | Dobereinder et al. | 701/217 |
| 4,964,052 | 10/1990 | Ohe | 701/208 |
| 4,999,783 | 3/1991 | Tenmouku et al. | 701/2 |
| 5,058,023 | * 10/1991 | Kozikaro | 701/217 |
| 5,119,301 | 6/1992 | Shimizu et al. | 701/217 |
| 5,155,688 | 10/1992 | Tanaka et al. | 701/22 |
| 5,311,173 | 5/1994 | Komara et al. | 342/995 |
| 5,311,195 | 5/1994 | Mathis et al. | 342/357.14 |
| 5,334,986 | 8/1994 | Fernhout | 342/357.14 |
| 5,359,529 | 10/1994 | Snider | 701/210 |
| 5,374,933 | 12/1994 | Kao | 342/357.13 |
| 5,422,639 | 6/1995 | Kobayashi et al. | 340/988 |
| 5,422,815 | 6/1995 | Hijikata | 701/208 |
| 5,428,545 | 6/1995 | Maegawa et al. | 701/210 |
| 5,523,765 | 6/1996 | Ichikawa | 342/451 |
| 5,552,990 | 9/1996 | Ihara et al. | 701/208 |
| 5,852,791 | 12/1998 | Sato et al. | 701/217 |
| 5,912,635 | * 6/1999 | Oshizawa et al. | 340/988 |
| 6,041,280 | 3/2000 | Kohli et al. | 701/201 |
| 6,167,347 | 12/2000 | Lin | 701/214 |
| 6,192,312 | * 2/2001 | Hummelsheim | 701/118 |

FOREIGN PATENT DOCUMENTS

WO 00/50917   8/2000   (WO) .

* cited by examiner

Primary Examiner—William A. Cuchlinski, Jr.
Assistant Examiner—Marthe Y. Marc-Coleman
(74) Attorney, Agent, or Firm—Frank J. Kozak; Lawrence M. Kaplan

(57) ABSTRACT

A program and method are disclosed that provide for determining a position of a vehicle relative to a road network represented by a geographic database. An intermediate position density is determined along a plurality of road segments in the road network by shifting a prior position density which had been determined along the plurality of road segments by a distance traveled by the vehicle since the prior position density had been determined. Then, the intermediate position density is modified to take into account sensor-derived data received since the prior position density had been determined to form a new position density. The sensor-derived data include data indicating three metrics, namely (1) a position of the vehicle, (2) a heading of the vehicle, and (3) a curvature history. The curvature history represents a change of heading of the vehicle as a function of distance. Then, the position of the vehicle is determined to be that location along the plurality of road segments at which the new position density is greatest. Also disclosed is a program and method that operate when it has been determined that the vehicle has just completed a turn. According to this program and method, processed data values from the sensors that indicate the vehicle position are adjusted to correspond to a position along the road network as represented by the geographic database. Further, if it has been determined that the vehicle is located on a straight road segment after having completed a turn, processed data values of the sensors that indicate a vehicle heading are adjusted to correspond to the heading of the straight road segment upon which the vehicle has been determined to be located.

20 Claims, 20 Drawing Sheets

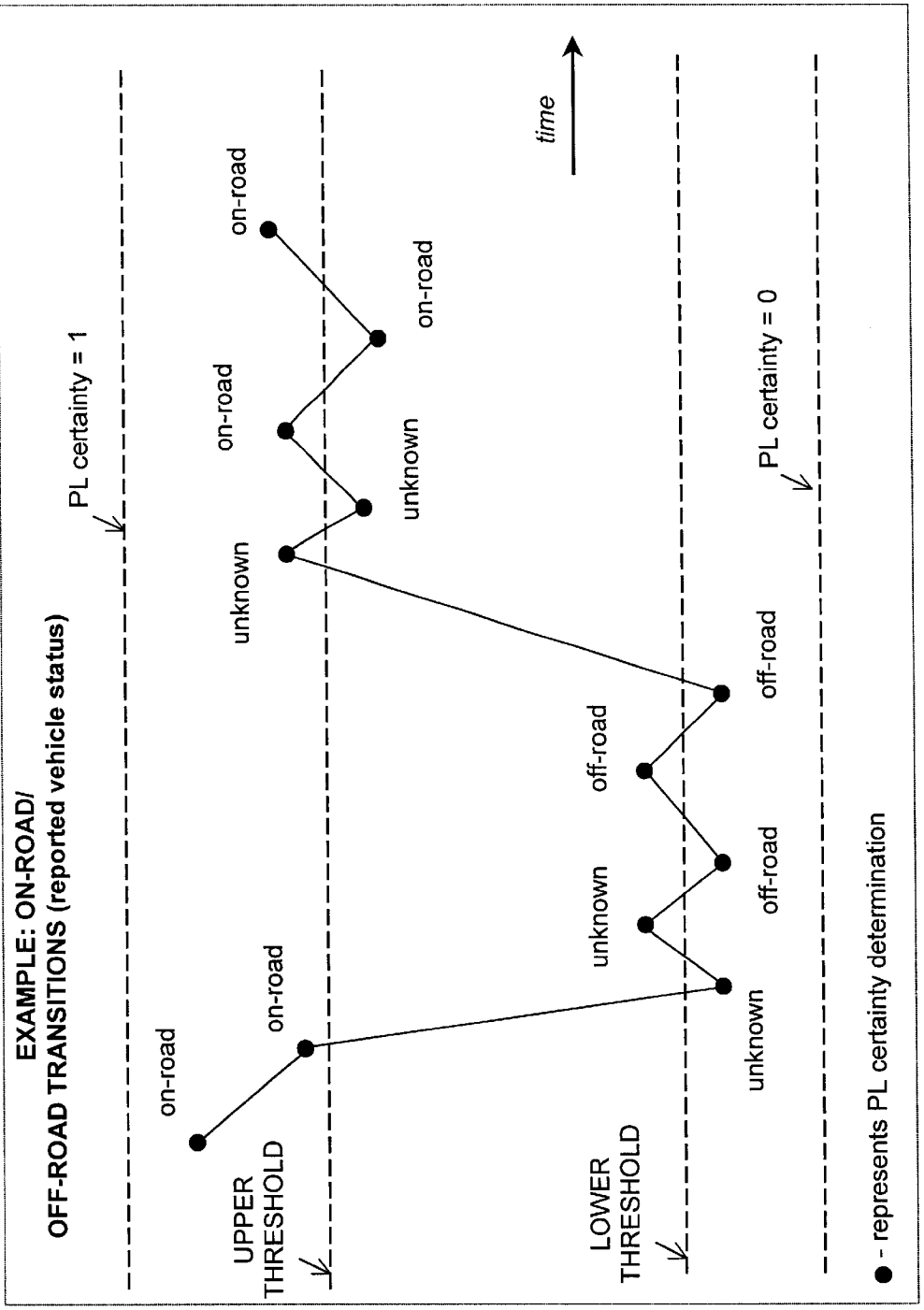

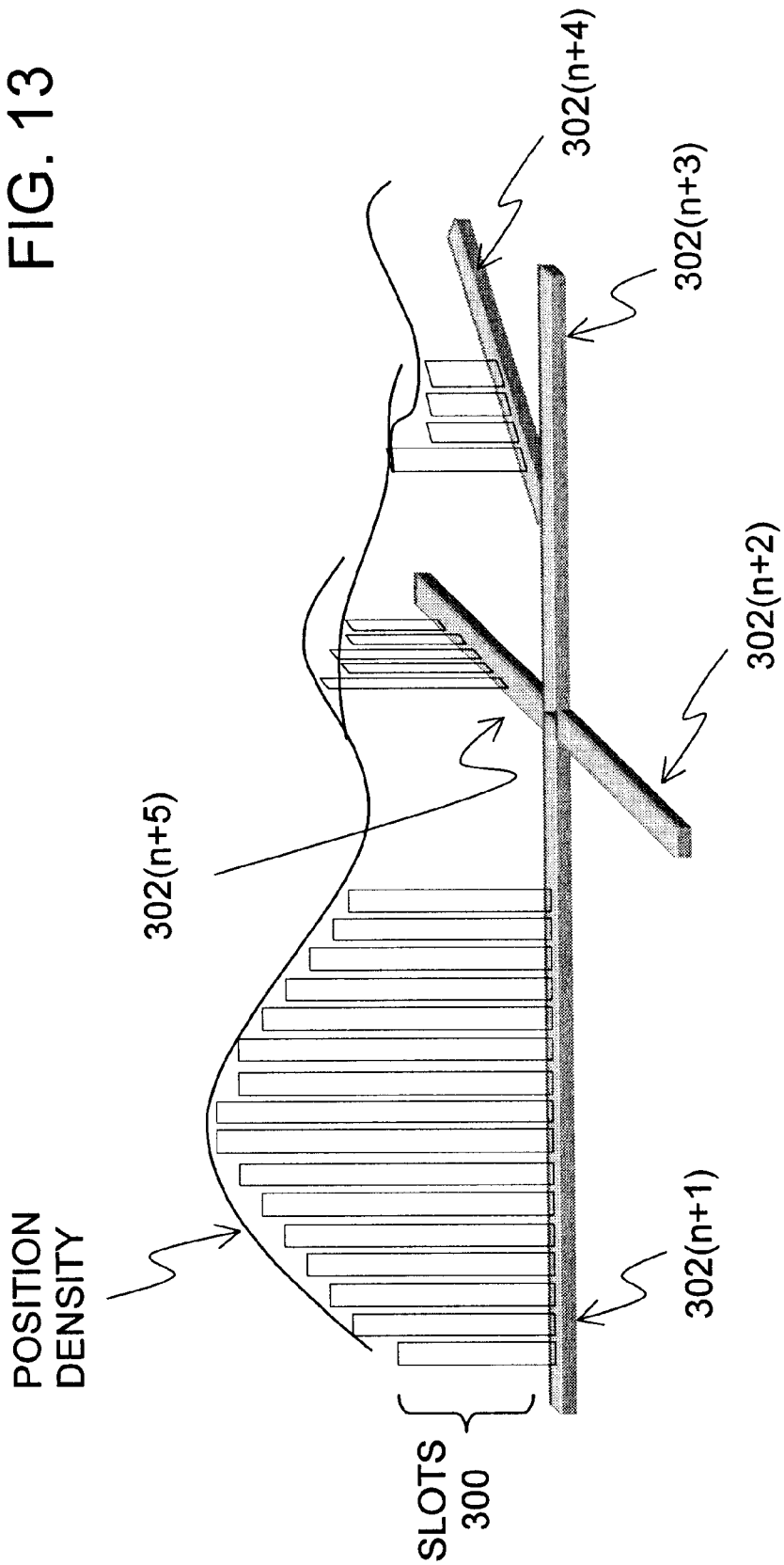

VEHICLE POSITIONING USING THREE METRICS

REFERENCE TO RELATED APPLICATIONS

The present application is related to the patent entitled "POSITION DETERMINING PROGRAM AND METHOD," U.S. Pat. No. 6,192,312 and the patent application "VEHICLE POSITIONING USING TURN DETECTION ALGORITHM," Ser. No. 09/680,161, filed on even date herewith, the entire disclosures of which are incorporated by reference herein.

BACKGROUND OF THE INVENTION

The present invention relates to a program and method used by a navigation system installed in a vehicle to determine in real time the position of the vehicle relative to data contained in a database that represents the road network on which the vehicle is traveling.

In-vehicle navigation systems provide a variety of useful features to end users (i.e., the drivers and/or passengers of the vehicles in which the navigation systems are installed). Included among the features that are provided by some in-vehicle navigation systems are route calculation, route guidance, emergency roadside services, electronic yellow pages, and so on. In order to provide these kinds of features, in-vehicle navigation systems use geographic data. The geographic data may be stored in the vehicle in which the in-vehicle navigation system is installed or alternatively, some or all of the geographic data may be stored remotely and made available to the navigation system in the vehicle through a wireless communication system which may be part of the navigation system. The geographic data include information about features in a covered geographic region. The geographic data include information about the location of roads, the speed limits along roads, turn restrictions at intersections, the names of roads, the address ranges along roads, the locations of points of interest, and so on.

Some of the features provided by in-vehicle navigation systems require that the position of the vehicle be determined. There are several considerations related to determining the position of the vehicle. For example, a GPS system may be used to obtain the geographic coordinates of the vehicle. However, the geographic coordinates only indicate the position of the vehicle relative to the surface of the earth. For some of the features provided by in-vehicle navigation systems, a means is required to determine the vehicle position relative to the road network represented by the geographic database used by the in-vehicle navigation system. In other words, if the vehicle is located on a road segment, a means is required to identify the road segment represented by data contained in the geographic database used by the in-vehicle navigation system, and preferably the position and direction of the vehicle along the represented road segment. Once the vehicle position is determined relative to the road segment represented by the geographic database, programming in the in-vehicle navigation system can be used to provide various features, such as determining a route to a desired destination, providing maneuvering instructions for reaching the destination, identifying the closest restaurant or gas station relative to the vehicle position, displaying a map of the area around the vehicle, and so on.

U.S. Pat. No. 6,192,312 discloses a method for determining a vehicle position relative to a road segment represented by data in a geographic database used by a vehicle navigation system. The method disclosed in U.S. Pat. No. 6,192,312 works well for many kinds of roads. However, there continues to be room for improvements. Accordingly, there is a need for an improved vehicle positioning program and method.

SUMMARY OF THE INVENTION

To address these and other objectives, the present invention comprises a program and method that provide for determining a position and direction of a vehicle relative to a road network represented by a geographic database. The program and method include the step of determining an intermediate position density along a plurality of road segments in the road network by shifting a prior position density which had been determined along the plurality of road segments by a distance traveled by the vehicle since the prior position density had been determined. Then, the intermediate position density is modified to take into account sensor-derived data received since the prior position density had been determined to form a new position density. The sensor-derived data include data indicating three metrics, namely (1) a position of the vehicle, (2) a heading of the vehicle, and (3) a curvature history. The curvature history represents the change of heading of the vehicle as a function of distance traveled. After the intermediate position density is modified, the position of the vehicle is determined to be that location along the plurality of road segments at which the new position density is greatest.

According to another aspect, a program and method operate when it has been determined that the vehicle has just completed a turn. According to this aspect, subsequent sensor-derived data that indicate the vehicle position are adjusted to correspond to a position along the road network as represented by the geographic database.

According to a further aspect, if it has been determined that the vehicle is located on a straight road segment, subsequent sensor-derived data that indicate a vehicle heading are adjusted to correspond to the heading of the straight road segment upon which the vehicle has been determined to be located.

BRIEF DESCRIPTION OF THE DRAWINGS

FIG. 11 is a diagram illustrating the operation of the positioning layer during on-road and off-road determinations.

FIG. 13 is another graphical illustration of how step functions are used to implement a position density along several road segments according to the embodiment of the positioning layer shown in FIG. 4.

DETAILED DESCRIPTION OF THE PRESENTLY PREFERRED EMBODIMENTS

I. Introduction—Vehicle Positioning Using Three Metrics

An embodiment of the vehicle positioning program that is the subject of the present specification is used in a navigation system that is similar to the system described in U.S. Pat. No. 6,192,312. Accordingly, portions of the present specification are similar to the disclosure of U.S. Pat. No. 6,192,312.

In an embodiment described in U.S. Pat. No. 6,192,312, a vehicle positioning program determined a vehicle position along a road network represented by a geographic database by updating a prior probability density. According to thee embodiment described in U.S. Pat. No. 6,192,312, the prior probability density is shifted along the represented road network by a distance t raveled and then the shifted density is updated using sensor-derived data relating to two metrics, namely the vehicle heading and the vehicle position as reported by sensors in the vehicle. In a present embodiment, a vehicle positioning program determines a vehicle position using sensor-derived data relating to three metrics. In addition to using the vehicle heading and position, the present embodiment of the vehicle positioning program uses a curvature history (i.e., heading change as a function of distance).

Further, the present embodiment uses a turn detection algorithm. The turn detection algorithm uses data indicating the vehicle position on a road (as represented by data in the geographic database) as a feedback mechanism to correct the processed values of the position and heading of the vehicle after the vehicle has completed a turn that matches the road geometry.

II. Exemplary Navigation System Platform/Environment

Figure 1:
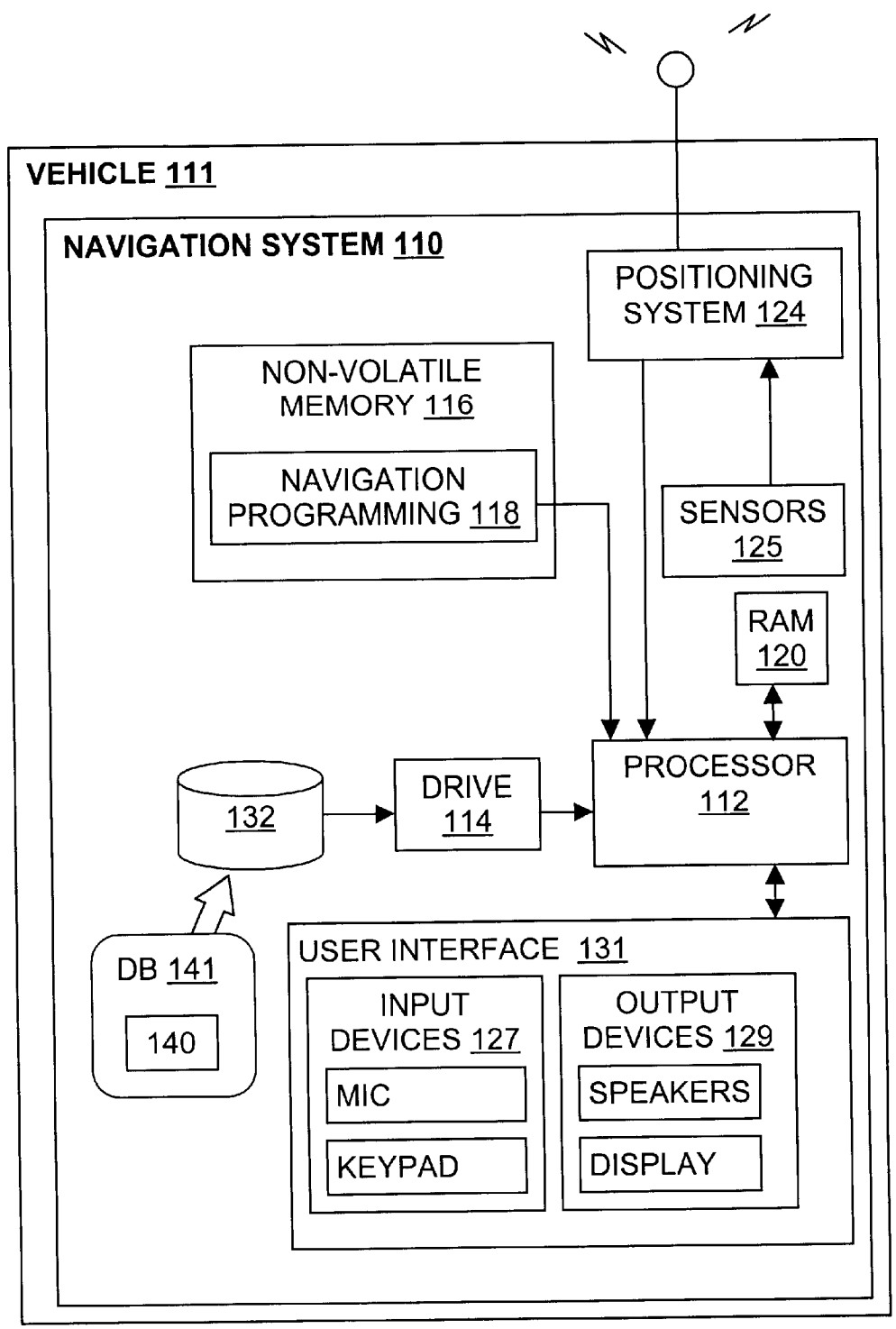
FIG. 1 is a block diagram illustrating a navigation system.

Referring to FIG. 1, there is a diagram illustrating an exemplary embodiment of a navigation system 110. In the embodiment shown in FIG. 1, the navigation system 110 is a portable system located in a vehicle 111, such as an automobile, truck, or bus. In other embodiments, the navigation system 110 may be installed in other platforms.

The navigation system 110 is a combination of hardware and software components. The hardware components of the navigation system 110 may include a processor 112, memory 120, and so on. In the embodiment of FIG. 1, the navigation system 110 also includes positioning system hardware 124 that collects data used to determine the position of the vehicle 111 in which it is installed. The positioning system hardware 124 may include sensors 125 or other components that sense the speed, orientation, direction, and so on, of the vehicle 111. The positioning system hardware 124 may also include a GPS system.

The navigation system 110 also includes a user interface 131. The user interface 131 includes appropriate means 127 for receiving instructions and/or input from an end user of the navigation system. For example, the user interface 131 may include an input panel, keyboard, microphone, voice recognition software, and so on, through which the end user may request navigation information. The user interface 131 also includes appropriate means 129 for providing information back to the end user. The user interface 131 may include a display or speakers (including speech synthesis hardware and software) through which the end user can be provided with information from the navigation system 110.

All of the components described above may be conventional (or other than conventional) and the manufacture and use of these components are known to those of skill in the art.

III. The Geographic Database

In order to provide navigation features to an end user, the navigation system 110 uses geographic data 140. The geographic data 140 may be stored in the vehicle 111 or alternatively, the geographic data 140 may be stored remotely and made available to the navigation system 110 in the vehicle 111 through a wireless communication system which may be part of the navigation system 110. In another alternative, a portion of the geographic data 140 may be stored in the vehicle 111 and a portion of the geographic data 140 may be stored in a remote location and made available to the navigation system 110 in the vehicle 111 over a wireless communication system from the remote location. In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed.

In one embodiment, the storage medium 132 is a CD-ROM. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 may be in the form of one or more computer-readable data files or databases 141. The geographic data 140 include information about the roads and intersections in or related to one or more geographic regions or coverage areas. This information includes data specifying the positions of the roads in the covered geographic region and also includes data about features relating to the roads, such as restrictions on directions of travel on the roads (e.g., one-way streets), turn restrictions, street addresses, street names, speed limits, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic database 141 may include other data about the geographic region.

The geographic database 141 may take a variety of different forms. In one embodiment, the geographic database 141 contains a plurality of road segment data entities. Each road segment data entity represents a portion (or segment) of a navigable road in the geographic region. In one type of geographic database 141, there is at least one database entry (also referred to as "entity" or "record") for each road segment represented in a geographic region. Each physical road segment has two nodes associated with it, one at each of the endpoints of the road segment. In this embodiment, the geographic data 140 also includes a plurality of data entities that represent these nodes. Each node data entity identifies the position (e.g., geographic coordinates) of one of the nodes at the end of a road segment.

Figure 2:
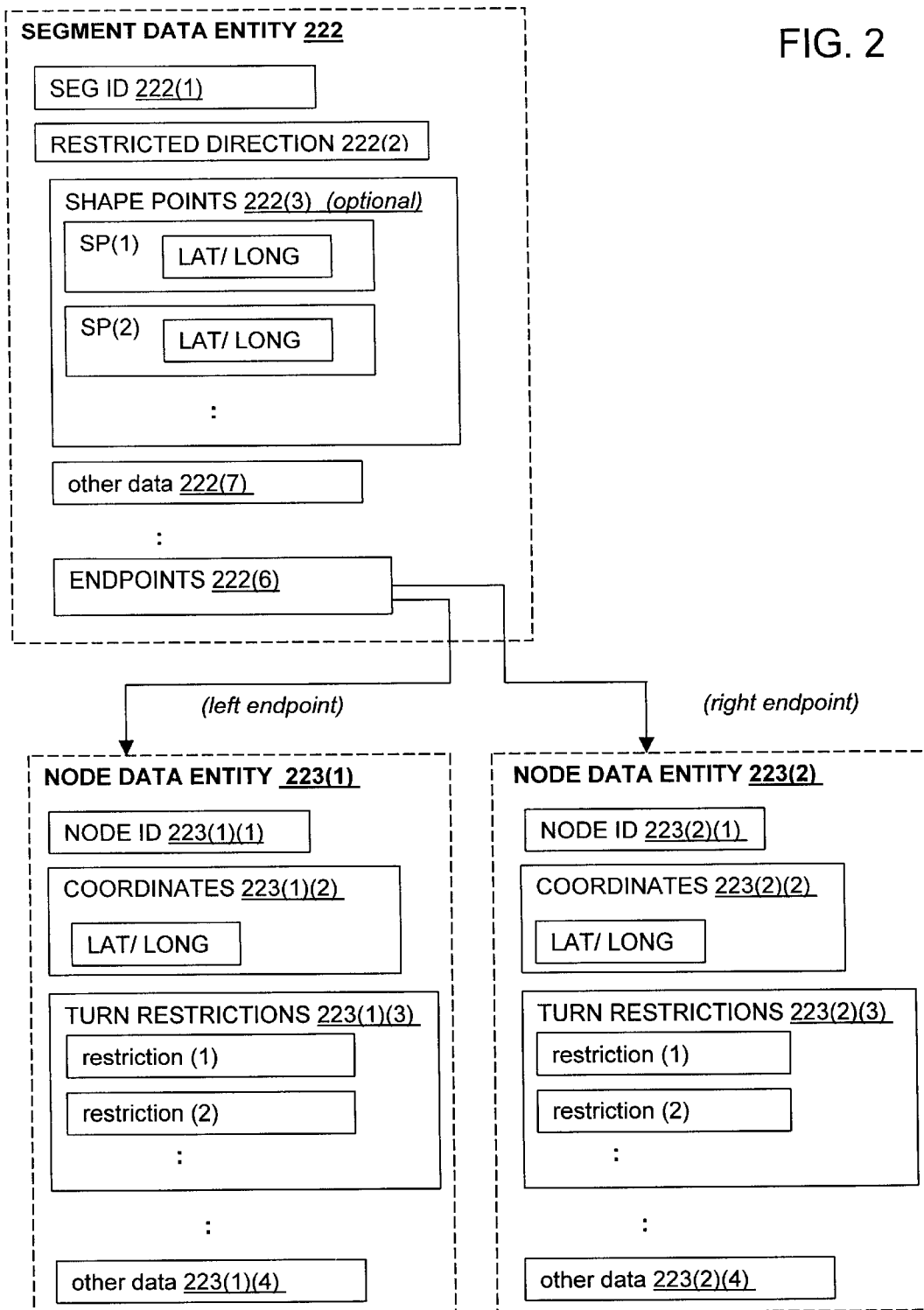
FIG. 2 is a block diagram illustrating components of a road segment data entity included in the geographic database depicted in FIG. 1.

Data are associated with each road segment data record to describe features or characteristics of the represented road segment. FIG. 2 illustrates some of the components of a road segment data entity 222 included in the geographic database 141. The road segment entity 222 includes a segment ID 222(1) by which the record can be identified in the geographic database. The road segment data entity 222 may also include data 222(2) that indicates the direction of vehicular travel permitted on the represented road segment.

The road segment data entity 222 also includes data 222(6) providing the geographic coordinates (e.g., the latitude and longitude) of the endpoints of the road segment. In one embodiment, this data 222(6) is a reference to node data entities 223(1) and 223(2) defined for the nodes corresponding to the endpoints of the represented road segment. Also associated with the road segment data entity 222 are data 223(1)(3) and 223(2)(3) indicating what, if any, turn restrictions exist at each of the endpoints of the road segment.

The road segment data entity 222 may also include one or more shape points 222(3). Each shape point 222(3) includes a pair of geographic coordinates through which the represented road segment passes between the endpoints thereof. The shape points may be used when the road segment is other-than-straight to define the shape of the represented road segment.

The various attributes associated with a road segment may be included in a single road segment record, or may be included in more than one type of record which are cross-referenced to each other. (The term "segment" represents only one terminology for describing this physical geographic feature and other terminology for this kind of feature is intended to be encompassed within the scope of these concepts.)

The road segment record 222 may also include or be associated with other data 222(7) that include or refer to various other attributes of the represented road segment. These other attributes may include the street address range along the represented road segment, the name of the road of which the represented road segment is a part, the highway designation of the road of which the road segment is a part, the speed limit along the road segment, the rank classification of the road segment, and so on.

In one embodiment, the geographic data are provided by Navigation Technologies Corporation of Rosemont, Ill. However it is understood that the inventive concepts disclosed herein are not restricted to any particular source of data.

IV. The Navigation Programming

A. Overview of the navigation programming

Figure 3:
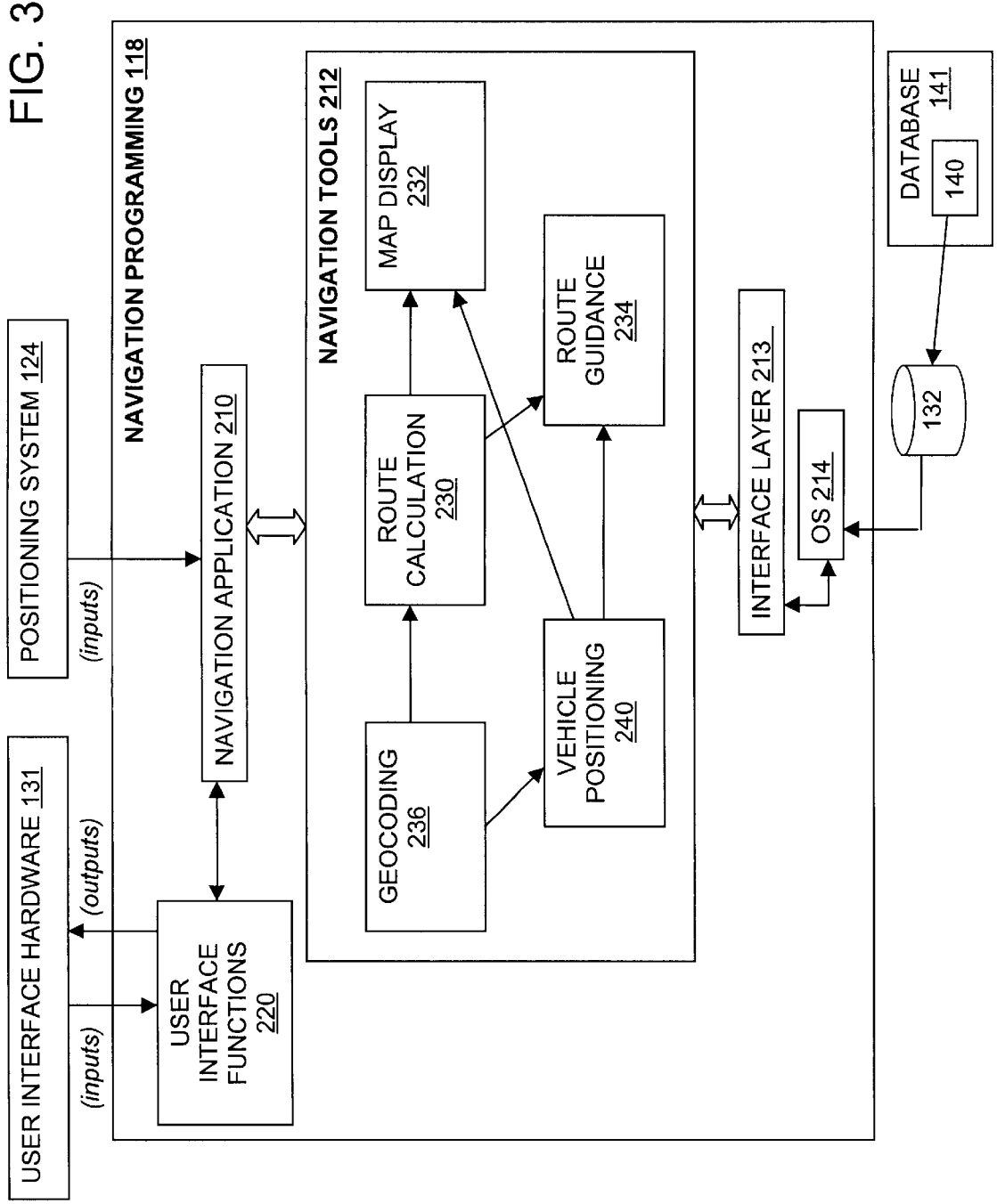
FIG. 3 is a block diagram illustrating components of the navigation programming depicted in FIG. 1.

Referring to FIGS. 1 and 3, in addition to the hardware components and geographic database, the navigation system 110 includes or uses navigation programming 118. The navigation programming 118 includes the software that provides for the functions and/or features performed by the navigation system 110. The navigation programming 118 uses the geographic data 140 in conjunction with input from the user interface 131, and possibly in conjunction with outputs from the positioning system hardware 124, to provide various features and/or functions.

The navigation programming 118 may be stored in a non-volatile storage medium 116 in the navigation system 110. Alternatively, the navigation programming 118 and the geographic data 140 may be stored together on a single storage device or medium. Alternatively, the navigation programming 118 may be located at a remote location and may be provided to or accessed by the navigation system 110 over a communications system.

The navigation programming 118 may be formed of separate component applications (also referred to as programs, subprograms, routines, or tools). The component applications of the navigation programming 118 may work together through defined programming interfaces. FIG. 3 shows a block diagram illustrating some of the component applications for one embodiment of the navigation programming 118 included in the navigation system 110 of FIG. 1. FIG. 3 shows only a portion of all the component applications that make up the navigation programming 118. Other component applications, programs or tools may be included in the navigation programming 118.

In the embodiment shown in FIG. 3, the navigation programming 118 is shown to include a navigation application 210 and one or more navigation tools 212. The navigation application 210 is a program or routine that provides for overall management of the functions of the navigation system 110. The navigation application 210 may also include support for and interfaces to the navigation system hardware, such as the positioning system hardware 124 and the user interface 131. For this purpose, the navigation application 210 shown in FIG. 3 includes user interface functions 220. These user interface functions 220 may provide for presenting a menu to the end user on a screen display of the user interface hardware 131, accepting inputs from the end user via the user interface hardware 131, displaying results to the end user on a screen display of the user interface hardware 131, and so on.

The navigation tools 212 are modular software libraries that provide for specific navigation functions to the performed by the navigation programming 118. In the embodiment of FIG. 3, the navigation tools 212 are programs that provide for functions that use the geographic data 140. According to one embodiment, the features or functions provided by the navigation tools 212 include route calculation 230, map display 232, route guidance 234, geocoding 236, and vehicle positioning 240. In alternative embodiments, the navigation tools 212 may provide more or fewer functions. The navigation tools 212 receive requests for navigation information from the navigation application 210. The navigation tools 212 request and obtain data 140 from the geographic database 141 and use the data to satisfy the requests for navigation information from the navigation application 210. The navigation tools 212 may obtain the geographic data 140 directly from the geographic database 141 on the medium 132 or alternatively, the navigation tools 212 may obtain the data 140 through an interface layer 213 and an operating system 214. In one embodiment, the navigation tools 212 are written in the C programming language although in alternative embodiments other programming languages may be used, such as C++, Java, Visual Basic, and so on.

B. The vehicle positioning tool

As stated above in connection with FIG. 3, the vehicle positioning tool 240 is one of the software libraries that may be included among the navigation tools 212. The vehicle positioning tool 240 determines the position of a vehicle relative to the geographic data 140 in the map database 141. In addition, the vehicle positioning tool 240 determines whether the vehicle is on or off the road network represented by the data 140 in the geographic database 141.

Figure 4:
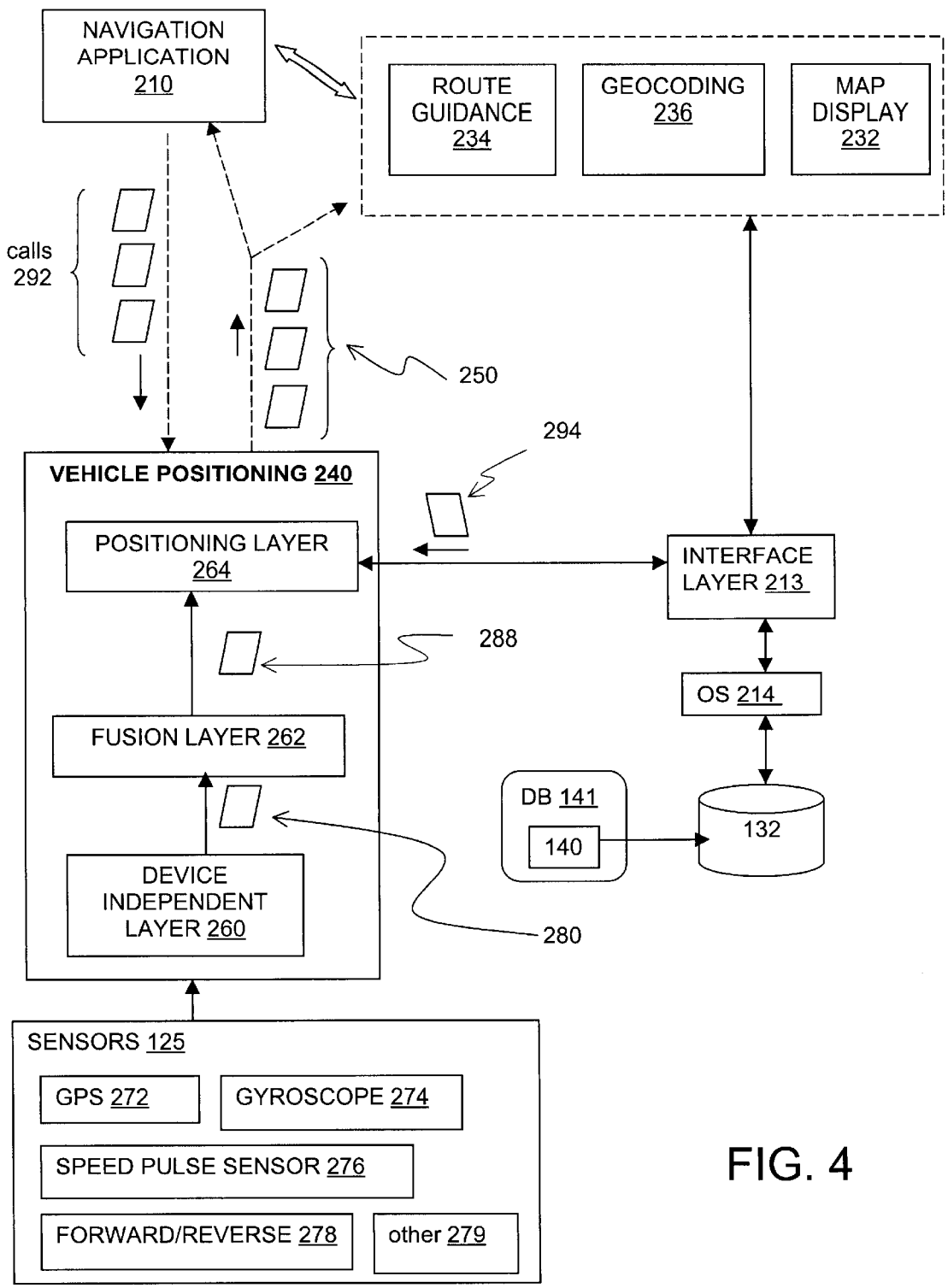
FIG. 4 is a block diagram illustrating components of the vehicle positioning tool program shown in FIG. 3.

Referring to FIG. 4, over time as the vehicle travels in the geographic region, the vehicle positioning tool 240 receives calls 292 requesting data identifying the vehicle position from the navigation application 210. The vehicle positioning tool 240 obtains data from the sensors 125 as input. In response to these requests for data identifying the vehicle position, the vehicle positioning tool 240 also obtains data from the geographic database 141. Upon calculating a new vehicle position (as described in more detail below), the vehicle positioning tool 240 provides an output 250 that represents the instantaneous location of the vehicle 111 with respect to the geographic data 140 in the geographic database 141, if the vehicle is on the road network. This output 250 is used by the map display tool 232, the route guidance tool 234, the geocoding tool 236, or directly by the navigation application 210.

In the embodiment shown in FIG. 4, the vehicle positioning tool 240 is shown as being comprised of a plurality of modular layers. In one embodiment, the vehicle positioning tool 240 is comprised of three layers. In other alternative embodiments, the vehicle positioning tool 240 may have more or fewer layers. In the embodiment of FIG. 4, the vehicle positioning tool 240 includes a device independent layer 260, a fusion layer 262 and a positioning layer 264. In this embodiment, the layers of the vehicle positioning tool 240 are modular. This means that the layers need not all be used together. Alternative embodiments of the navigation application and/or vehicle positioning program can use some or all of the layers together.

The device independent layer (or "device layer") 260 is the lowest level layer. The device independent layer 260 manages sensor data and converts the sensor data into a device independent format that can be utilized by the higher layers. Sensor outputs from different sources (e.g., manufacturers) may have different formats. For example, sensor outputs from different manufactures may have different voltages, different numbers of output bit resolutions, different timings, etc. The device independent layer 260 provides the advantage that the vehicle positioning tool 240 is able to accommodate different kinds of sensors from different manufacturers or different models of sensors from the same manufacturer.

In one embodiment, the vehicle positioning tool 240 uses the outputs of the following kinds of sensors 125: a GPS receiver 272, a gyroscope 274, a speed pulse sensor 276, and a forward/reverse sensor 278. (The vehicle positioning tool 240 can use other kinds of sensors 279 in addition to these, such as an accelerometer or differential wheel speed sensors.)

The GPS (Global Positioning System) receiver 272 uses signals from a constellation of a plurality of satellites to compute the position of the GPS receiver 272 relative to the earth. The GPS satellites transmit signals on different frequencies. These signals are received by the GPS receiver 272. The position reported by the GPS receiver 272 is an estimate of the true position on the earth. The reported position may be in error or inaccurate due to such factors as multipath interference, atmospheric distortion, and so on.

The gyroscope 274 is a type of sensor that reports the angular velocity of the vehicle 111. The output of the gyroscope 274 is a known, factory-specified value when the vehicle 111 is at rest or traveling in a straight (or substantially straight) line.

The speed pulse sensor 276 is a type of sensor that indicates the speed of the vehicle 111. The speed pulse sensor 276 outputs a number of speed pulses per unit time. The number of pulses reported by this sensor per unit time is proportional to the speed of the vehicle 111. This value can be used to compute the distance traveled by the vehicle 111 in a given time.

The forward/reverse sensor 278 provides an indication whether the vehicle 111 is travelling in a forward direction or in a reverse direction.

The outputs of these sensors 125 may be affected by many variable factors, such as the ambient temperature, the age of the sensor, and the stability of the power supply as well as other factors that are difficult or impossible to control. Accordingly, the vehicle positioning tool 240 treats sensor measurements as approximations. In one embodiment of the vehicle positioning tool 240, the sensor measurements can be treated as random variables.

The device independent layer 260 converts or otherwise transforms the outputs from the various sensors 125 into a predetermined format. The outputs of the various sensors are included in an output 280 of the device independent layer 260. The output 280 is passed to the fusion layer 262. The fusion layer 262 combines or fuses the various outputs received from the device independent layer. For example, the various sensors in the device independent layer 260 may generate data at different times or periods. In one example, the gyroscope 274, and the forward/reverse sensor provide outputs every 0.1 second and the GPS receiver provides an output every second.

According to one embodiment, the fusion layer 262 uses the data from the device independent layer 260 to compute an optimal (e.g., least-squares) estimate of the true position of the vehicle. This may be accomplished by various known techniques, such as dead-reckoning, Kalman filtering, or other techniques which are known in the art. The fusion layer determines this optimal position estimate without reference to the map data from the geographic database. Thus, this optimal position estimate is defined by geographic coordinates (i.e., latitude, longitude). This optimal position estimate (also referred to as the "dead-reckoned position") is included as part of an output 288 of the fusion layer 262. This output 288 is passed to the positioning layer 264.

When computing the optimal position estimate, the fusion layer 262 also determines a covariance matrix associated with the optimal position estimate. The covariance matrix associated with the optimal position estimate is also included as a part of the output 288 of the fusion layer.

In one embodiment, the output 288 of the fusion layer also includes additional data. In one embodiment, the output 288 includes data indicating the vehicle heading (and the variance associated with the heading), data indicating the vehicle speed (and the variance of the speed) and data indicating the distance traveled (and the variance associated with the distance traveled). The positioning layer 264 uses the data in the output 288 to determine the location of the vehicle on the road network (i.e., relative to the data in the map database 141.) The processes used by the positioning layer 264 are described in detail below.

As mentioned above, the layers of the vehicle positioning tool 240 are modular, i.e., they need not all be used together. Therefore, the positioning layer 264 does not require that the data it receives (i.e., 288) come from the fusion layer 262. For example, the positioning layer 264 may receive the data directly from the device layer 260.

V. The Positioning Layer

A. Overview

The positioning layer 264 is that part of the vehicle positioning tool program 240 that uses the sensor-derived data to determine whether the vehicle is on or off the road network represented by the data in the geographic database and, if the vehicle is on the road network, the positioning layer determines the vehicle position relative to the road network. Upon making these determinations, the positioning layer 264 provides an output indicating whether the vehicle is on or off the road network and, if the vehicle is on the road network, the positioning layer provides an output indicating the vehicle position relative to the road network. The positioning layer makes these determinations and provides these outputs in response to requests for a current vehicle position made by another program, such as the navigation application (210 in FIG. 4). Over time, the operation of the positioning layer comprises a series of consecutive iterations of the positioning layer function in response to a series of requests for the current vehicle position.

In performing its function, the positioning layer determines a position density associated with selected road segments of the road network. The value of the position density associated with each point along these selected road segments represents the likelihood that the vehicle is located at that point. The position density is, at each point on the road network and for each sensor, multiplied with the likelihood of measuring the measured value(s).

Each road segment permits travel in one or both directions. Accordingly, in one embodiment of the positioning layer programming, each road segment is associated with two position densities, one for each direction of travel.

The positioning layer determines this position density using the data 288 from the underlying layer. The data 288 includes or is derived from the sensors (e.g., 125 in FIGS. 1 and 4).

The positioning layer function incorporates an implementation of Bayes' rule. Each iteration of the positioning layer function (while the vehicle is on the road) includes the following steps. Given some initial probability density along each segment of the road network at time n, update this set of position densities using the sensor information retrieved at time n, and find the point $\theta_{MLE}$ along the road network where the probability density function is maximum. This is the point on the road network where the vehicle has a maximum likelihood of being located, given the sensor measurements. The updated densities are then used as the initial densities at the next call to positioning layer at time n+1. The details of the positioning layer function are described below.

(The terms "probability density" and "variance" are used here in a general sense. A true density function would integrate to "1" and satisfies other requirements. These requirements are not imposed here.)

B. Positioning layer inputs and outputs.

(1). Calls to the Positioning Layer and Outputs Therefrom

With reference to FIG. 4, upon receiving a request 292 from the navigation application 210, the positioning layer 264 provides an output 250 indicating the vehicle position. This output 250 is provided to the navigation application 210, as well as other programs, such as the route guidance tool 234 and the map display tool 232. Thus, in this embodiment, the operation of the positioning layer 264 is driven by a series of requests for the vehicle position from the navigation application 210. Accordingly, the navigation application 210 includes appropriate programming that periodically (or non-periodically) generates and sends a request to the vehicle positioning tool 240 for an updated, current vehicle position. These requests may be generated and sent at various configurable time intervals. These time intervals may include once per second, ten times per second, once every two seconds, or any other time interval, or as needed. The time interval may be selected to be consistent with the computing resources of the navigation system. The time interval may also be selected so that it is consistent with the navigation application(s) being supported. For example, safety-related applications, such as obstacle avoidance, may require that the vehicle position be updated more frequently than other kinds of applications, such as map display.

In alternative embodiments, the requests for updated, current vehicle positions may come from another program, such as one of the navigation tool programs 212. Alternatively, the requests for updated, current vehicle positions may be generated by a standalone timing module. In another alternative embodiment, the vehicle positioning tool 240 may generate its own requests for an updated vehicle position internally. Thus, instead of responding to a series of requests for a current vehicle position, the vehicle positioning tool 240 may continuously and/or regularly provide and update a data output indicative of the vehicle position, which is then accessed and used, as needed, by any other program, such as the navigation application 210.

(2). Inputs to the Positioning Layer

Continuing with reference to FIG. 4, in response to the calls 292 for the vehicle position, the positioning layer 264 requests and obtains the data 288 that include the dead-reckoned position and heading, and the covariances associated therewith, as well as other sensor data and variances thereof. As mentioned above, the positioning layer 264 receives the position, sensor and variance data 288 from the underlying layer, which in this embodiment is the fusion layer 262. The positioning layer 264 uses these measurements and their associated densities and variances to determine whether the vehicle is on or off the road network, and the position of the vehicle on the road network if the vehicle is determined to be on the road network.

Each measurement is treated as a random variable due to the uncertainty in the measurement. The associated probability density functions are treated by the positioning layer 264 as Gaussian random variables ("wrapped Gaussian" in the case of the heading). The probability density function of a Gaussian random variable can be completely described by its mean and variance. Therefore, the following kinds of data are included in the input 288 to the positioning layer 264:

(1). The heading, speed and distance measurements are reported to the positioning layer 264. (The distance measurement is obtained by integrating the speed. A measurement of the change of heading and/or distance may also be reported to the positioning layer or alternatively a measurement of the change of heading and/or distance may be determined by the positioning layer using the reported heading and distance measurements.)

(2). The variances of the heading, speed and distance measurements.

(3). The output of the GPS receiver 272 is reported as a position, i.e., a latitude, longitude pair. The latitude and longitude are assumed to be Gaussian random variables. The covariance matrix of the GPS measurement is reported to the positioning layer 264 layer along with the measurements themselves.

(4). The output of the forward/reverse sensor 278 is reported to the positioning layer 264.

While performing the positioning function, the positioning layer 264 obtains map data 294 from the map database 141, as needed, as explained below. The map data 294 may be obtained through the interface layer 213 and/or the operating system 214 from the storage medium 132.

C. Positioning layer operation

For purposes of describing the normal, ongoing operation of the positioning layer programming, it is assumed that a position density had been determined along selected road segments as part of a previous iteration of the positioning layer function in response to a previous call for the vehicle position. (In this embodiment, the previous iteration of the positioning layer is taken to mean the iteration of the positioning layer function that occurs immediately prior the current iteration of the positioning layer function. In alternative embodiments, a prior position density may include a position density calculated in an iteration of the positioning layer function that occurred earlier than the immediately prior iteration.) In the special case in which there is no prior position density from a previous iteration of the positioning layer function (e.g., at start up, initialization, or loss of data), a different procedure is used. The procedure used when there is no prior position density is described below.

Figure 5:
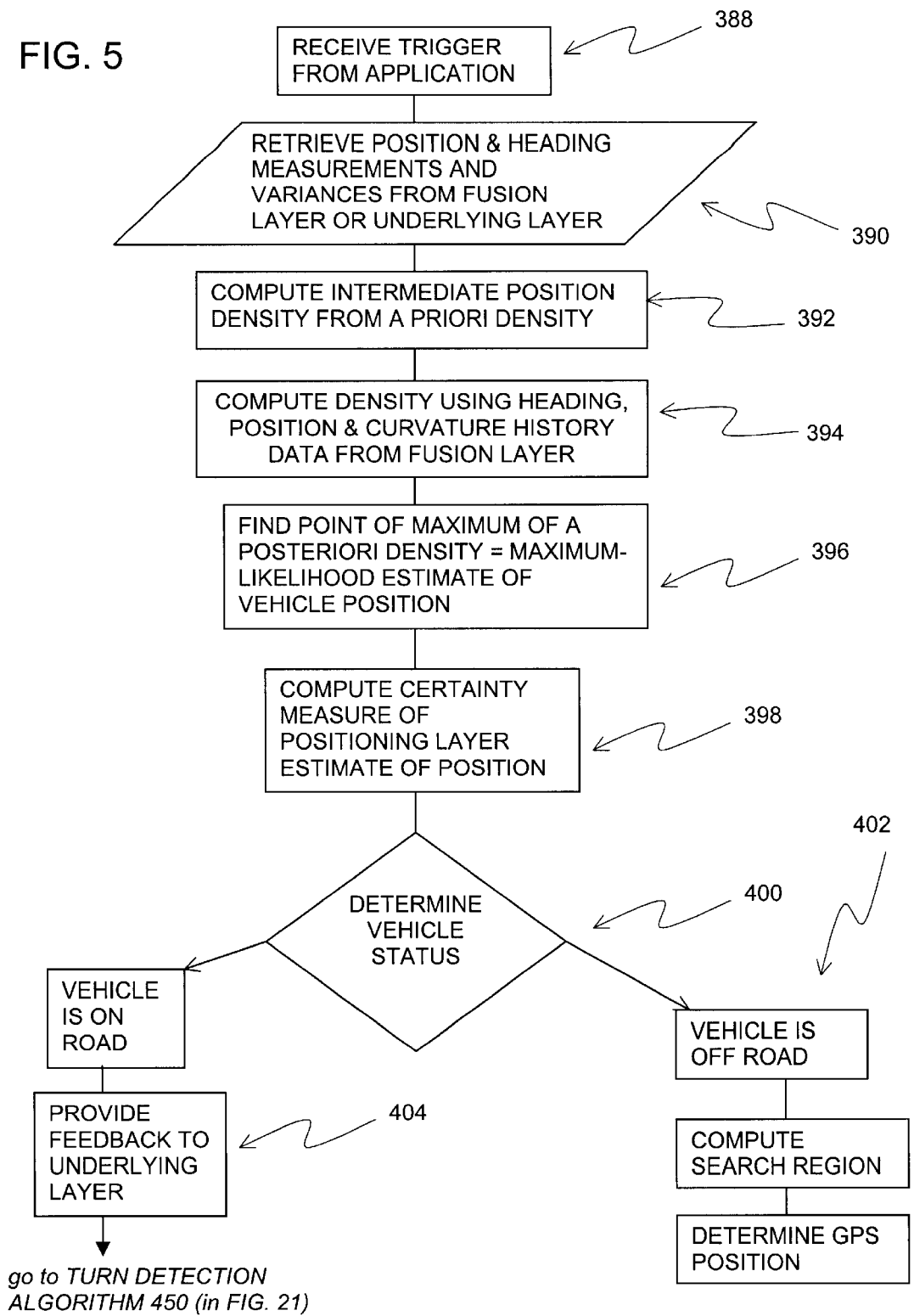
FIG. 5 is a flow diagram of the operation of the embodiment of the positioning layer shown in FIG. 4.

During normal, ongoing operation of the positioning layer programming, some or all the steps shown in FIG. 5 are performed in one iteration of the positioning layer function. As explained below, in formulating the output for each request for a vehicle position, the positioning layer programming determines an updated position by (1) shifting the prior position densities by the distance traveled, taking into account the error included in the measurement of the distance traveled, (2) applying the newly acquired position data, heading data, and curvature history data (i.e., heading change as a function of distance), and variance data for the position and heading, to the shifted position density, (3) identifying the location of the vehicle as that location at which the position density is greatest, and (4) upon detecting that the vehicle has completed a turn and is on a represented road segment, updating the sensor-derived position and heading using the map data. This process is continued for each new request for an updated vehicle position. The manner in which the positioning layer implements these processes is described below.

(1). Retrieval of Position and Variance Data

An iteration of the positioning layer programming begins upon receiving a trigger ("call 292" in FIG. 4) for the vehicle position from the navigation application 210 (Step 388 in FIG. 5). Upon receiving a call for the vehicle position, the positioning layer 264 retrieves data from the fusion layer 262 (or other underlying layer) that includes the computed estimate of the position (i.e., latitude, longitude) of the vehicle and the covariance matrix for this estimate (Step 390 in FIG. 5). In addition, the positioning layer 264 also retrieves (from the fusion layer 262 or other underlying layer) the data indicating the distance along with the corresponding variance of this measurement. The positioning layer 264 may also retrieve data indicating the curvature history (i.e., the change of heading and distance as a function of distance) or alternatively a measurement of the change of heading and distance may be determined by the positioning layer using the reported heading and distance measurements. The positioning layer 264 also retrieves other data, including the data indicating the forward/reverse direction.

Alternatively, the positioning layer may obtain and incorporate other data. For example, the positioning layer may also obtain the GPS position and covariance thereof from the device independent layer. The positioning layer may also obtain and use both the GPS position and covariance from the GPS receiver as well as the fused position and covariance from the fusion layer. The positioning layer is configurable in that it can obtain and use data (position and variance) from different sources and from more than one source.

(2). Distance Updating

The positioning layer uses the data that indicates the distance traveled since the last iteration of the positioning layer function. The positioning layer uses the distance traveled information to update the a priori road segment densities (Step 392 in FIG. 5). This distance updating step is illustrated in FIGS. 6 and 7.

When updating the a priori road segment densities, the positioning layer shifts the a priori road segment densities by the distance traveled along the road segments to which the densities are associated. The distance traveled, as measured by the odometer or speed pulse sensor (276 in FIG. 4) includes its own error. Therefore, the measured distance traveled is itself a random variable. Accordingly, this updating step takes the form of a convolution instead of a simple shift. Specifically, the a priori density $\pi_{prior}(\Theta)$ on the road network is convolved with the density $f(d)$ of the distance measurement to obtain an intermediate a priori density function, which is denoted as $\pi_{intermediate}(\Theta)$, i.e., $$\pi_{intermediate}(\Theta) = \int \int \pi(x) f(\Theta - x) dx \, d\Theta \qquad (1)$$

Figure 6:
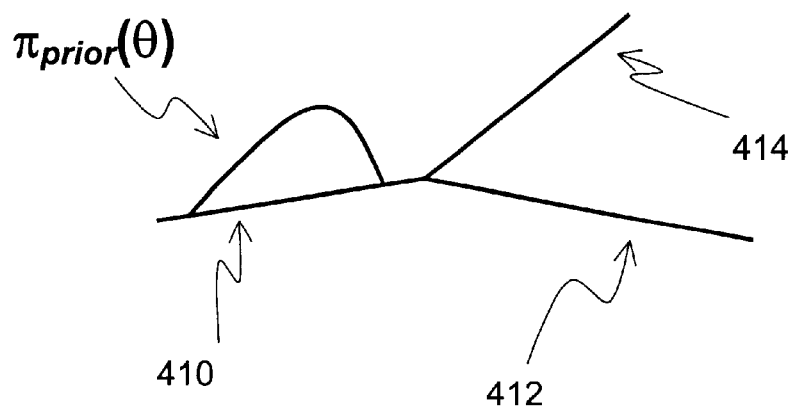
FIG. 6 is a map diagram of several road segments with a graphical representation of a position density associated therewith that illustrates operation of the embodiment of the positioning layer shown in FIG. 4.
Figure 7:
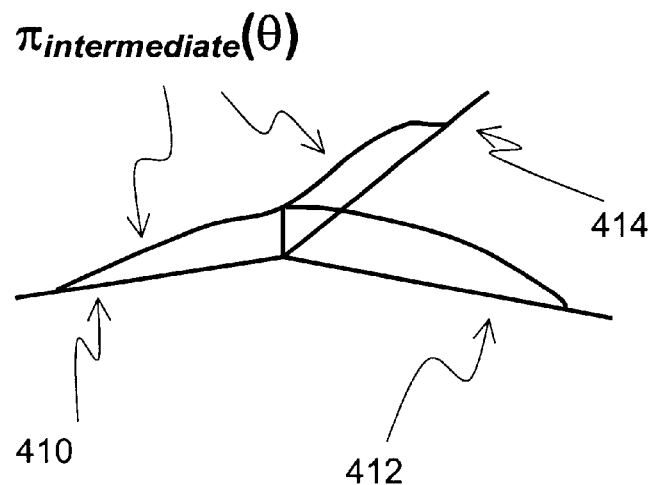
FIG. 7 is a map diagram of the same road segments shown in FIG. 6 with a graphical illustration of the position density at another stage of operation of the embodiment of the positioning layer.

FIG. 6 shows a map with three road segments, labeled 410, 412, and 414. The original a priori density $\pi_{prior}(\Theta)$ shown in FIG. 6 is associated with the road segment labeled 410. During the distance updating step performed in one iteration of the positioning layer, the original a priori density $\pi_{prior}(\Theta)$ is updated to yield the intermediate a priori density, $\pi_{intermediate}(\Theta)$, shown in FIG. 7. As shown in FIG. 7, the position density has been shifted from its original position on the road segment labeled 410 so that it is now spread over the road segments 410, 412, and 414. Note that when the position density is shifted, a convolution of the position density by the distance traveled is performed. This has the effect of flattening out the position density at this intermediate stage. This flattening out represents the error (uncertainty) associated with the odometer (e.g., speed pulse sensor) from which the distance traveled is determined.

(3). Determination of Most Likely Estimate

After the intermediate position density is determined using the distance traveled, the other sensor data, such as the data indicating the vehicle heading, position, and change of heading as a function of distance (i.e., curvature history), are used to determine a new position density from which the vehicle position can be determined. When determining a new position density, the positioning layer uses a maximum-likelihood approach. In the following, $\vec{X}$ denotes the vector of all sensor measurements. The positioning layer computes, at each point $\Theta$ along the road network, the a posterior probability that the true position of the vehicle is $\Theta$, given the measured sensor outputs $\vec{X}$ (Step 394 in FIG. 5). This is denoted the a posterior probability density function $\pi_{posteriori}(\Theta|\vec{X})$. In order to compute $\pi_{posteriori}(\Theta|\vec{X})$, a continuous form of Bayes' Rule is used. For example, see Berger Casella, "Statistical Analysis" p. 297, Danbury Press, 1990. Bayes' Rule allows the computation of an a posterior probability in terms of the a priori probability using the following relationship, $$\pi_{posteriori}(\Theta | \vec{X}) = \frac{f(\vec{X} | \Theta)\pi_{intermediate}(\Theta)}{\int\int f(\vec{X} | \Theta)\pi_{intermediate}(\Theta)d\Theta} \quad (2)$$

where $f(\vec{X}|\Theta)$ is the a density function representing the set of sensors and $f(\vec{X}|\Theta)$ is the likelihood of measuring the sensor readings or values $\vec{X}$ when being at the position $\Theta$ on the road network. The maximum likelihood approach involves computing $\pi_{posteriori}(\Theta|\vec{X})$ for all $\Theta$ and determining the point at which $\pi_{posteriori}(\Theta|\vec{X})$ is maximum. This $\Theta$ is the maximum-likelihood estimate $\Theta_{MLE}$ of the true position of the vehicle, subject to the constraint that the vehicle is on the road network. All quantities are positive since they are probabilities. For purposes of determining the position of the vehicle, the location of the point along the road network at which $\pi_{posteriori}(\Theta|\vec{X})$ has a maximum value is of interest, and not the value itself. Therefore, the denominator in Equation (2) can be dropped. The following quantity is computed.

$$\pi_{posteriori}(\Theta|\vec{X}) = f(\vec{X}|\Theta)\pi_{intermediate}(\Theta) \quad (3)$$

where $\pi_{intermediate}(\Theta)$ and $\pi_{posteriori}(\Theta|\vec{X})$ are unnormalized probability density functions.

Figure 8:
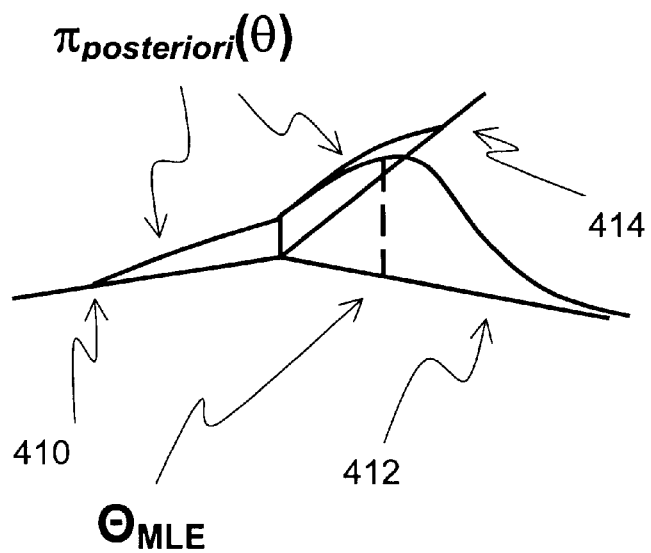
FIG. 8 is a map diagram of the same road segments shown in FIGS. 6 and 7 with a graphical illustration of the position density at yet another stage of operation of the embodiment of the positioning layer.

This updating step yields a new set of probability densities along the road. This is illustrated in FIG. 8 in which the intermediate a priori density (shown in FIG. 7) is updated to yield the new probability density shown in FIG. 8. In FIG. 8, the probability densities along the road segments, 410, 412, and 414, have been decreased to reflect the contributions of the measured sensor values.

(4). Three Metrics

As mentioned in the foregoing section, after the intermediate position density is determined using the distance traveled, a new position density is determined using sensor data. In one embodiment, three metrics are used to determine the new position density. These three metrics include the vehicle heading, the vehicle position and the curvature history (i.e., the change of heading as a function of distance traveled).

Data representing these three metrics are obtained from the fusion layer. These three types of data are used to modify the intermediate position density (i.e., the shifted prior position density). Each of these three types of data are compared to the heading, position, and curvature history at locations along the intermediate position density. To the extent that the intermediate position density does not match the data from the fusion layer, the intermediate position density is decreased correspondingly.

With respect to heading and position, the fusion layer provides data indicating these types of data. As an example, the fusion layer may indicate the vehicle heading as 125 degrees. If the intermediate position density at a particular location has a heading other than 125 degrees, the intermediate probability density at that location is decreased by a corresponding amount. Likewise, the fusion layer may report the vehicle position as x degrees latitude and y degrees longitude. An intermediate position density at a particular location is reduced by an amount that corresponds to the distance of the location from the position reported by the fusion layer.

(5). Using Curvature History (Heading Change as a Function of Distance) as a Metric when Determining Vehicle Position (a). Curvature history and heading change In addition to heading and position, the positioning layer uses curvature history as a third metric to determine the vehicle's position along the road. "Curvature" of a (vehicle) trajectory in the plane can be defined as the instantaneous rate of change of heading with respect to distance traveled (e.g., dh/ds). Curvature is a purely geometric quantity that can be measured and matched to road geometry stored in a database. "Heading change", (e.g., $\Delta h/\Delta s$) can be defined as change of heading preceding a certain instant over some fixed distance. Like curvature, heading change depends only on road trajectory and can similarly be measured and matched to the direction changes preceding some certain point in the database road geometry. Matching heading changes can be used to help determine the position of a vehicle at a certain point at a certain instant. Matching heading changes has an advantage over matching curvature in that the database geometry is piecewise linear and thus provides only changes in direction and not instantaneous curvature.

The curvature metric is defined as the comparison of the curvature of the sensor data and the curvature of the map data. The curvature of the sensor data is measured as the accumulative heading change over a distance as reported by the sensors. The curvature of the map data is measured by the accumulated heading change over a distance as stored in the map geometry database.

According to the present embodiment, heading changes are measured by the gyroscope (274 in FIG. 4) or other type of angular velocity sensor. Speed is measured by a speed pulse sensor (276 in FIG. 4). An equation for heading change as a function of sensed voltage, and of distance changes as a function of sensed speed pulse, are governed by coefficients that are iteratively updated by a Kalman filter.

Angular velocity and speed are simultaneously sampled (e.g., every 0.1 second). Integration (summing) of angular velocity (resp. speed) yields heading change (resp. distance) between a certain sample instant and previous sample times. Thus, sample points for these heading changes versus distances traveled are formed and are matched to the preceding (in driving direction) heading changes as a function of distance at a candidate point (and driving direction) in the database geometry. Because sample distance increases with time, the sample points are extended by linear interpolation to yield sample heading change as a function of sample distance. At a candidate point in the database geometry, the preceding heading change is a function of preceding distance. The integral of the absolute value of the difference between these functions (possibly multiplied by some positive decreasing function) over some fixed distance, divided by the distance, is a metric which is used to determine the probability that the vehicle is located at the candidate point (with the candidate driving direction).

(b). Implementation

In one embodiment, angular velocity ($\omega = d\theta/dt$) is measured at 0.1 second intervals from a sampled voltage using the following relationship.

$$\omega = \text{scaling factor} * (\text{voltage} - \Delta v_\psi) \tag{4}$$

Similarly, speed ($v = ds/dt$) is measured at 0.1 second intervals from a sampled pulse count using the following relationship.

$$v = (\text{pulse count} * \text{distance-per-pulse})/(1/10) \tag{5}$$

The fusion layer 262 provides estimates for scale, $\Delta v_\psi$, and distance_per_pulse, together with their variances.

At each epoch (t=0), the heading difference between the current heading and the heading at previous time $t = ^{-1}/_{10}$, $^{-2}/_{10} \ldots ^{-K}/_{10}$ is measured using the following relationship.

$$\theta(0) - \theta(-K/10) = \sum_{i=0}^{K-1} \omega(-i/10) * (1/10) \tag{6}$$

Similarly, the distance traveled is measured using the following relationship.

$$S(0) - S(-K/10) = \sum_{i=0}^{K-1} v(-i/10) * (1/10) \tag{7}$$

Thus, sample points for heading difference as a function of distance traveled are measured.

$$\Theta^{measured}(0) - \Theta^{measured}(S) \tag{8}$$

Figure 9B:
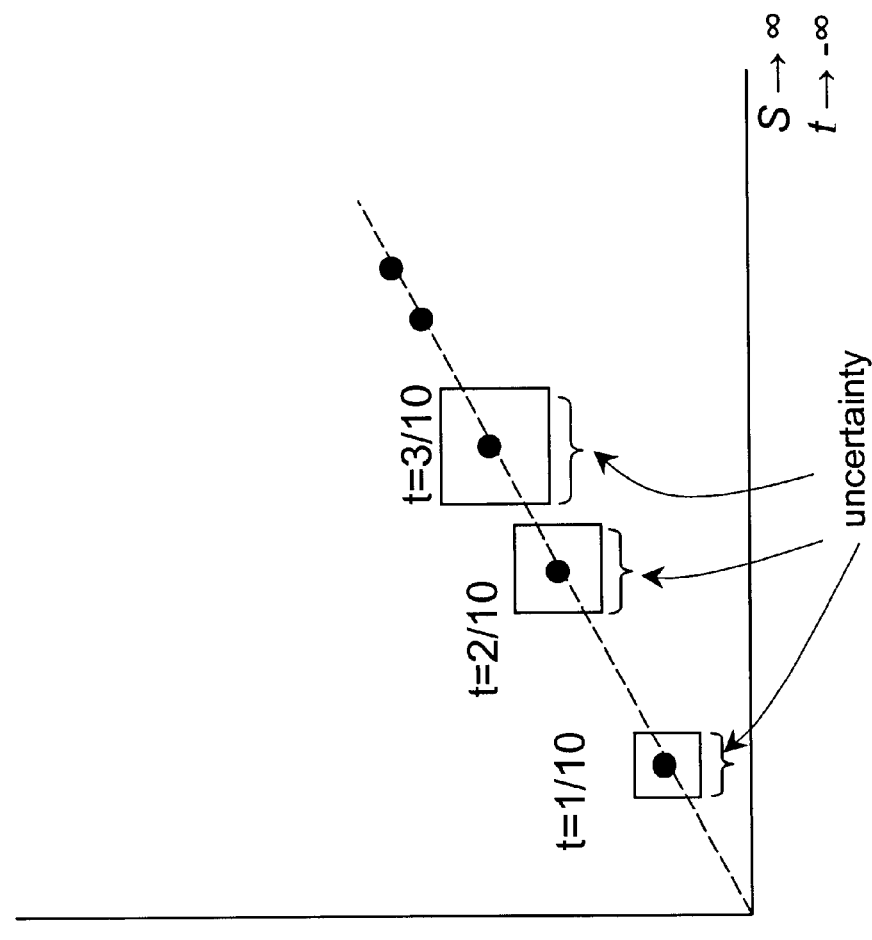
FIG. 9B is a graph of the change of heading as a function of distance traveled measured at points along the road geometry shown in FIG. 9A.
Figure 9A:
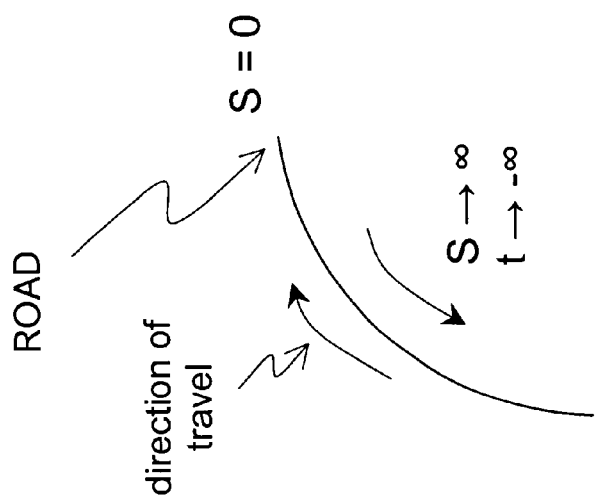
FIG. 9A illustrates a curved road geometry.

FIG. 9A illustrates a curving portion of road and FIG. 9B is a graph illustrating measurement of sample points for heading difference along a curving portion of road. (Note that the boxes around the sample points in the graph of FIG. 9B show increasing variances of $\theta$ and S as S increases.)

Figure 10B:
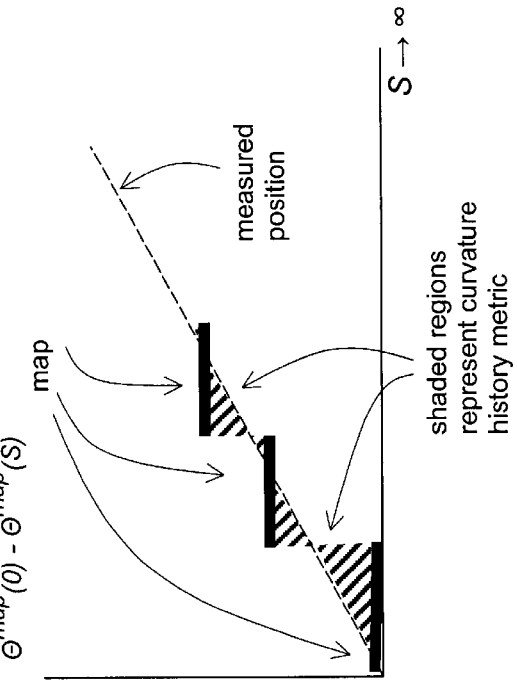
FIG. 10B is a graph of the change of heading measured at points along the road geometry shown in FIG. 10A.
Figure 10C:
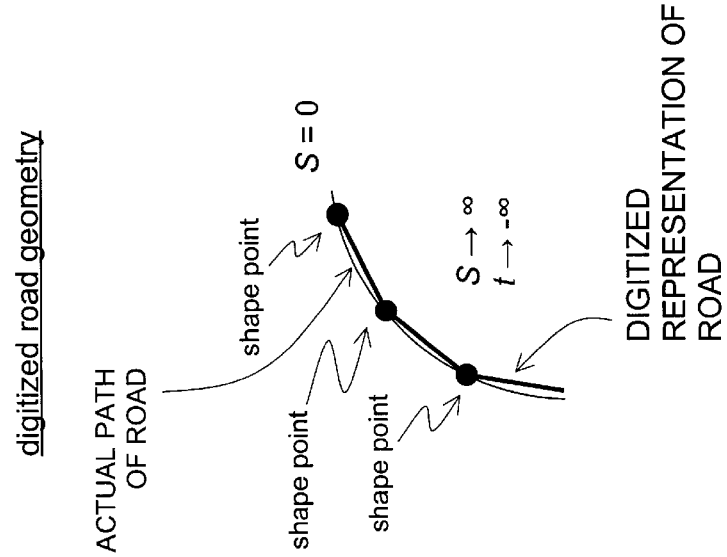
FIG. 10C is a graph similar to the graph in FIG. 10B and shows the curvature history metric.
Figure 10A:
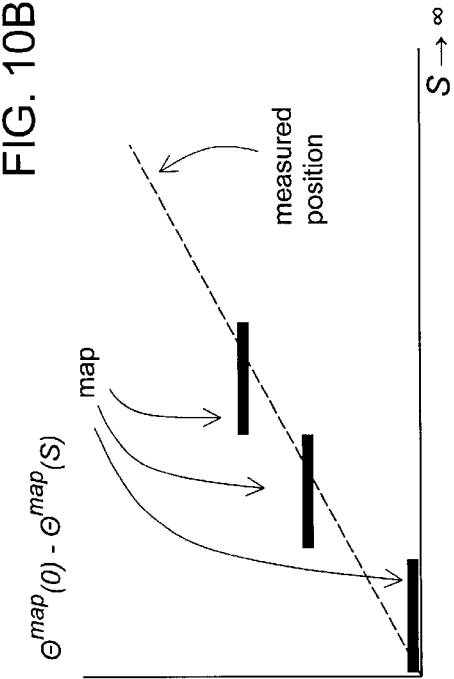
FIG. 10A illustrates how curved road geometry is represented by the geographic data used by the navigation system of FIG. 1.

In the geographic database used by the navigation system, the road geometry is digitized (with nodes and shape points) as piecewise linear, as illustrated in FIG. 10A. Thus, for each point on the digitized road geometry, together with a direction of travel, the heading difference $\Theta^{map}(0) - \Theta^{map}(S)$, as a function of distance traveled prior to that point (S), is a step function, as illustrated in the graph of FIG. 10B. The graph of this step function is compared to the graph of FIG. 10A for certain candidate points S, and a measure of this comparison (as described herein) is used to update the probability that the vehicle is located at S.

In this embodiment, the positioning layer uses curvature history (specifically, change of heading as a function of distance) in addition to heading and position to determine the vehicle's position along the road. In the embodiment described herein, the positioning layer applies data indicating the change of heading as a function of distance to the candidate position point so that the change of heading is implemented as a step function. A metric comparing $\Theta^{measured}(0) - \Theta^{measured}(S)$ to $\Theta^{map}(0) - \Theta^{map}(S)$ can be used to adjust the probability of a candidate position point. For example, the probability of a candidate position point can be multiplied by a factor, which is determined from the following relationship $$\frac{1}{S_1} \int_0^{S_1} |(\Theta^{measured}(0) - \Theta^{measured}(S)) - (\Theta^{map}(0) - \Theta^{map}(S))| \tag{9}$$

$$\left(1 - \left(\frac{S}{S_1}\right)^K\right) ds$$

where
1. $\Theta^{measured}(0) - \Theta^{measured}(S)$ is extended by linear interpolation between sample points.
2. $S_1$ is the constant distance over which this metric is computed.
3. $K > 0$ can be used to mitigate against the increasing variances of the sample points $\Theta^{measured}(0) - \Theta^{measured}(S)$.

FIG. 10C shows the same graph as in FIG. 10B. FIG. 10C shows the areas between the map positions and the reported positions shaded in. These shaded areas represent the curvature history metric as determined by Equation 9.

An advantage of using the curvature history as a metric is that it depends only on the heading differences and does not depend on the initial heading.

(6). Determining the Vehicle Position

The next step performed by the positioning layer is to determine the estimated position of the vehicle on the road network. The point on the road network where the value of the probability density function is greatest is determined to be the location of the vehicle (Step 396 in FIG. 5). Referring to FIG. 10, the point along the road segments at which the position density is greatest is labeled, $\Theta_{MLE}$. The position indicated by $\Theta_{MLE}$ represents the most likely estimate of true position of the vehicle. Data (250 in FIG. 4) identifying this point comprise the output of the positioning layer 264. The data (250 in FIG. 4) may include an identification of the road segment upon which the vehicle position is located. Alternatively, the data identifying this point may also include the position along the road segment at which the position density is greatest. The position along the road segment may be identified by various means. For example, the position may be identified by dividing the length of the road segment between its endpoints into a number of sub-sections (e.g., 256) and identifying which of the sub-sections is associated with the vehicle position. Alternatively, the position along the road segment may be identified by a distance (e.g., x meters) from one end (e.g., the left node). Other means for identifying the position along the road segment may be used. The data indicating this position is reported to the navigation application (e.g., 210 in FIG. 4) that called the positioning layer. The data indicating the position may also be reported to other applications or programs.

(7). Continuing Operation

At the next call to the positioning layer, the computed a posteriori probability density $\pi_{posteriori}(\Theta|\vec{X})$ along the road network is used as the initial (a priori) density $\pi_{priori}(\Theta)$ and the updating continues as described above.

D. Determination of on/off road status

It is possible that the vehicle may go off road during driving. This may occur unintentionally or intentionally. For example, the vehicle may enter a parking lot or garage. The positioning layer 264 detects if this has occurred and passes this information to the calling application 210. The positioning layer 264 determines whether the vehicle has gone off road by computing a measure of the certainty of the computed (unnormalized) a posteriori probability density function $\pi_{posteriori}(\Theta|\vec{X})$ and therefore of the maximum-likelihood estimate $\Theta_{MLE}$ (Step 398 in FIG. 5). This certainty measure is the ratio of the integrated (unnormalized) a posteriori probability density $\pi_{posteriori}(\Theta|\vec{X})$ to the integrated (unnormalized) intermediate density $\pi_{intermediate}(\Theta)$, i.e., $$PL_{certainty} = \frac{\int_\Theta \int \pi_{posteriori}(\Theta|\vec{X}) d\Theta}{\int_\Theta \int \pi_{intermediate}(\Theta) d\Theta} \quad (10)$$

The probability density function $f(\vec{X}|\Theta)$ is the likelihood that the measurement vector is $\vec{X}$ given that the true vehicle position is $\Theta$. The certainty measure will be high if for high likelihood $\pi_{intermediate}(\Theta)$, $f(\vec{X}|\Theta)$ is also large, i.e., the measurement vector $\vec{X}$ is consistent with the location $\Theta$ being the true location of the vehicle. One or more thresholds may be defined to distinguish when the certainty measure is high. The positioning layer may provide feedback to the fusion layer if the computed certainty of the positioning layer 264 output is high (Step 404 in FIG. 5). Various types of feedback mechanisms can be implemented. One type of feedback mechanism is implemented to keep the processed values of the absolute position and heading values up to date. A description of one type of feedback mechanism is described below in connection with FIG. 21.

If the certainty is low (e.g., below one or more defined thresholds), then the positioning layer determines that the vehicle is off the road network (Step 400 in FIG. 5). If the vehicle is determined to be off the road network, the positioning layer reports to the navigation application an indication that the vehicle is off the road network. If the vehicle is determined to be off the road network, the positioning layer may pass on to the navigation application the absolute geographic position instead of a computed position relative to the map data (Step 402 in FIG. 5). The absolute geographic position may be that position reported by the underlying layer (such as the fusion layer). The absolute position may be that geographic position determined by dead-reckoning, GPS, a combination of dead-reckoning and GPS, or other methods or systems. Alternatively, the positioning layer may pass to the navigation application the location of the point along the road network that is closest to the absolute position.

In one embodiment, the positioning layer uses the transitions of the certainty measure $PL_{certainty}$ across two thresholds to determine the vehicle status. These two thresholds are used by the positioning layer programming to determine whether the status of the vehicle is "on-road", "unknown", or "off-road." The "unknown" state serves as an intermediate state or buffer state. If the status of the vehicle is "on-road", it can change to "off-road" only by passing through the state of "unknown." Likewise, if the status of the vehicle is "off-road", it can change to "on-road" only by passing through the state "unknown."

As explained above, a low value of the certainty measure $PL_{certainty}$ indicates that the sensor readings are not consistent with the intermediate position density. Accordingly, if the certainty measure $PL_{certainty}$ falls below the lower of the two thresholds, the vehicle's status drops by one. If the status had been "on-road", it changes to "unknown." If the status had been "unknown", it changes to "off-road." However, since "off-road" is the lowest possible vehicle status, if the vehicle status had been "off-road", it will stay "off-road."

Likewise, a high value of the certainty measure $PL_{certainty}$ indicates sensor readings consistent with the intermediate position density. Accordingly, if the certainty measure $PL_{certainty}$ falls above the upper threshold, the vehicle status goes up by one. If the vehicle status had been "off-road", it changes to "unknown." If the vehicle status had been "unknown", it changes to "on-road." However, since the "on-road" status is the highest possible status, if the vehicle status had been "on-road", it will stay "on-road."

Using the two thresholds in this manner provides additional buffering and makes the "on-road" to "off-road" (and vice versa) detection smoother. It reduces the likelihood of erroneous determinations of the vehicle being on-road or off-road due to transient incorrect sensor readings.

A diagram illustrating the operation of the positioning layer during a series of on-road and off-road determinations is illustrated in FIG. 11.

E. Determination of new position density

Under some circumstances, when the positioning layer is called to provide the current vehicle position, there may not be a reliable prior position density to update. This might occur at initialization when the navigation system containing the positioning layer programming is first started up. This may also occur when the data defining the prior positioning density is unavailable, corrupted, or unreliable. This might occur if the vehicle has been moved without causing the odometer to provide an output, such as when the vehicle is transported by ferry. This might also occur if the vehicle position status has been determined to be "off road" or "unknown."

In an iteration of the positioning layer function, if a prior position density is not available or reliable, a new position density is determined using a search region. There are alternative ways by which a search region can be determined. In one alternative, the positioning layer programming uses the position measurement provided by the GPS receiver 272 and/or the position as determined by the fusion layer and the corresponding elliptical percentage error regions (e.g., 95%) of these measurements to determine the search region. According to another alternative, the positioning layer programming determines a search region by using an area of fixed size, e.g., 50 meter radius, 100 meter radius, 100 meter square, etc. After the search region is determined by either of these methods or by another method, the positioning layer programming assigns all of the road segments within this search region a uniform position density. The uniform position density indicates that all positions on the road network within this search region are equally likely since no better information is available.

As mentioned above, a new search region may be used when the prior position density is unavailable or reliable. If a prior position density is unavailable, the uniform position density associated with the new search region is treated like the intermediate density function, as described above. If a prior position density was available, but unreliable, e.g., the vehicle status was "unknown" or "off-road", the prior "unreliable" position density may be combined with the uniform position density associated with the new search region to form a new intermediate position density.

After the intermediate position density is formed, the other sensor data are applied to this intermediate density to form a new position density which is then examined to find the point at which the density is greatest. This point is reported to the calling application as the vehicle position unless the vehicle status is determined to be "off road." After the vehicle position is reported, the new position density is used as the prior position density during the next call to the positioning layer for the current vehicle position, in the manner described above.

VI. Exemplary Implementation of Positioning Layer

A. Overview.

The foregoing section described the processes included in the positioning layer programming. Those of skill in the art will recognize that there are various means by which the disclosed processes can be implemented. It should be understood that the inventive aspects of the disclosed position determining program and method are not limited to any specific implementation.

One particular embodiment of the positioning determining program and method uses step functions to represent a position density along road segments. The use of step functions facilitates certain of the processes performed by the position determining programming. The use of step functions to represent a position density provides significant advantages by reducing the computational requirements of the position determining programming, thereby enhancing performance of the system platform in which the position determining programming is installed. Using step functions to represent the position densities provides a configurable level of accuracy that can be matched to other processes and components in the platform in which the position determining programming is installed.

In one embodiment of the positioning layer 264, the step functions are implemented by defining slots. A slot is a temporary data structure used by the positioning layer 264 to represent a continuous length along a road segment at which the position density has a single value.

Figure 12A:
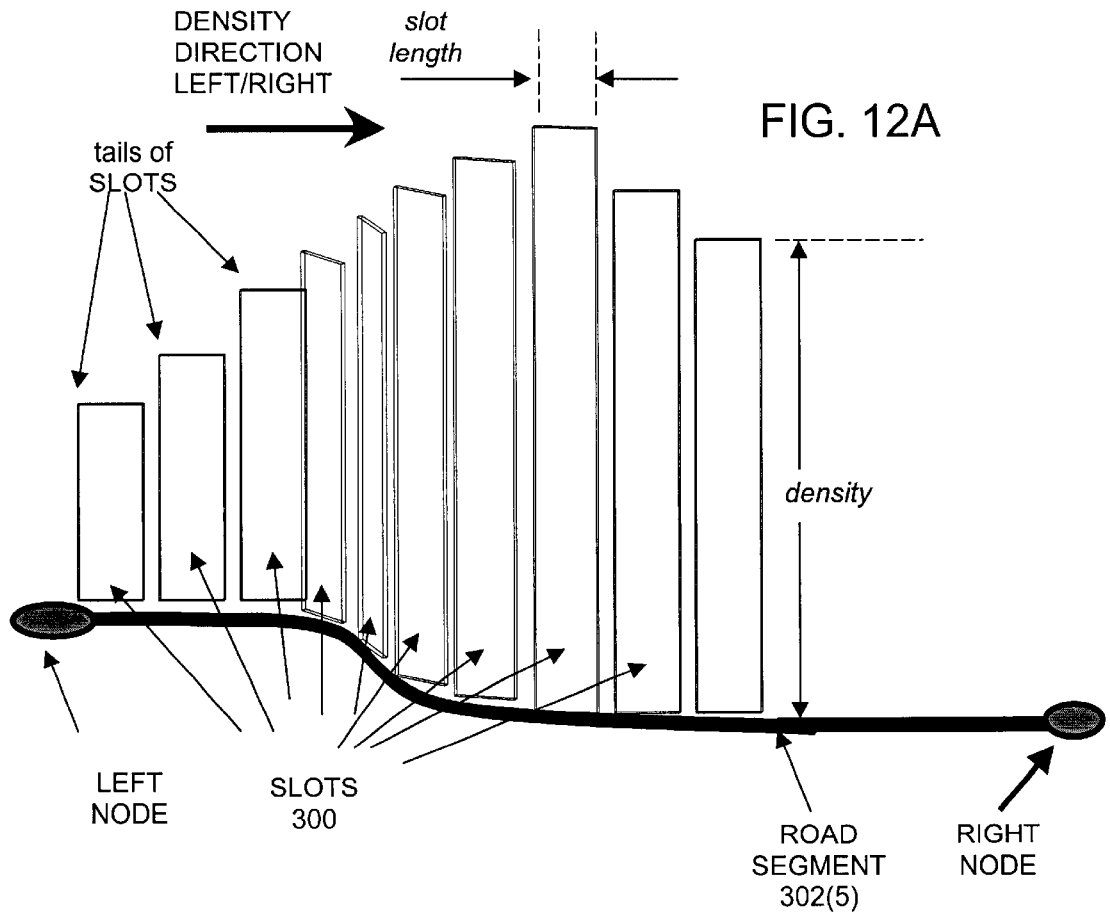
FIGS. 12A and 12B are graphical illustrations of how step functions are used to implement a position density along a road segment according to an embodiment of the positioning layer shown in FIG. 4.
Figure 12B:
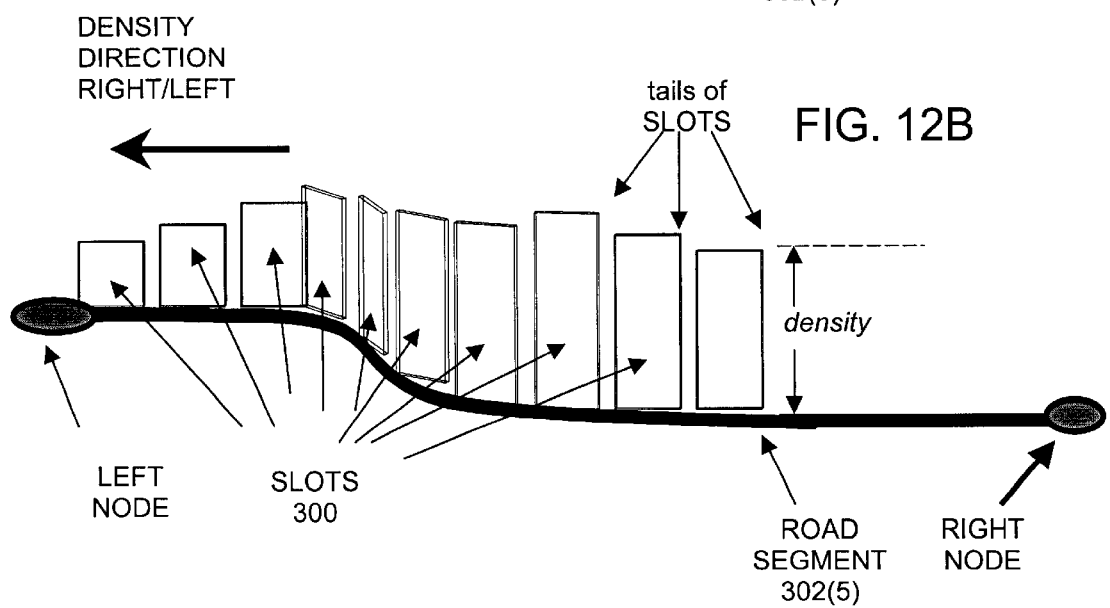

FIGS. 12A, 12B and graphically illustrate the relationship between slots and road segments. In FIGS. 12A and 12B, a plurality of slots 300 are illustrated occupying positions end-to-end along the road segment 302(n). In FIG. 13, a plurality of slots 300 are illustrated occupying positions end-to-end along road segments 302(n+1) ... 302(n+4), etc. (In these figures, some of the slots are omitted to facilitate illustration.) Each slot has a length (i.e., a "slot length"). All the slots on all the road segments 302(n), 302(n+1), etc., are defined to have the same slot length. In one embodiment, the slot length is 1024 centimeters. However, in alternative embodiments, the slot length can be selected to be any value. The slot length is related to the level of resolution to be provided by the vehicle positioning tool. Factors that can be considered when selecting the slot length may include consistency with the accuracy of the data in the geographic database, consistency with the accuracy of the sensors, and consistency with the processing resources of the hardware platform (e.g., navigation system 110) in which the positioning layer 264 is installed.

As stated above, because the vehicle can travel in either direction along a road segment, each road segment has two position densities—one for each direction of travel. Accordingly, the positioning layer 264 associates two sets of slots with each road segment. FIG. 12A shows the slots 300 representing the position densities for the direction of travel from the left node to the right node of the road segment 302(n). FIG. 12B shows the slots 300 representing the position densities for the direction of travel from the right node to the left node of the road segment 302(n).

Figure 14:
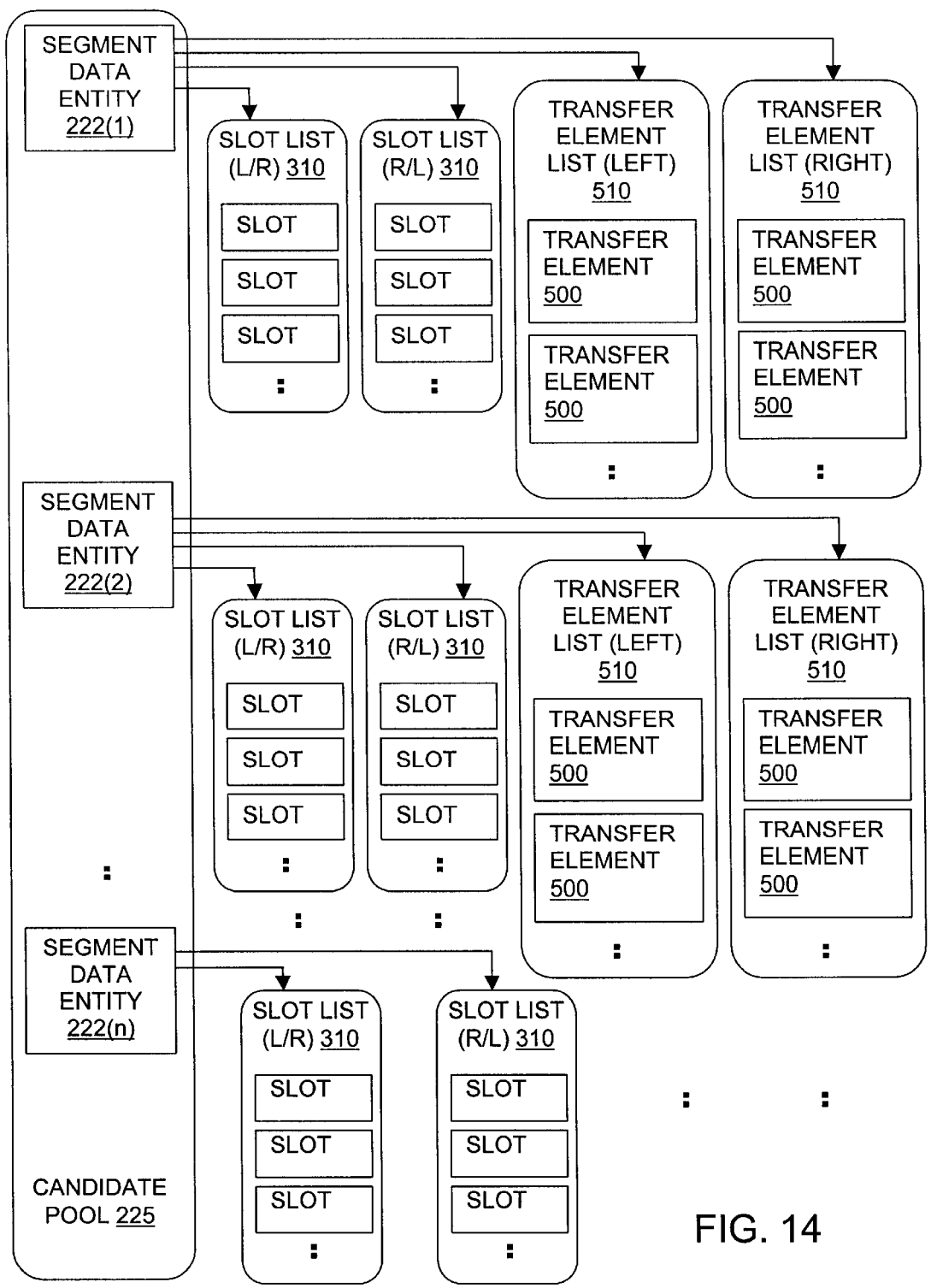
FIG. 14 is a diagram illustrating slot lists associated with several road segment data entities formed in accordance with the step functions used to implement the embodiment of the positioning layer shown in FIG. 4.

In order to manage the slots, the positioning layer 264 forms and maintains lists that identify the slots associated with each road segment. FIG. 14 illustrates a plurality of slot lists 310. As shown in FIG. 14, the slot lists 310 are associated with several road segment data entities 222(1), 222(2) ... 222(n). Each of these lists 310 is associated with the road segment data entity 222 that represents the corresponding road segment to which the slots in the list are associated. The positioning layer 264 maintains two slot lists 310 for each road segment. One list (labeled "L/R") identifies the slots associated with the direction of travel from the left node to the right node of the road segment and the other list (labeled "R/L") identifies the slots associated with the direction of travel from the right node to the left node of the road segment.

Figure 15:
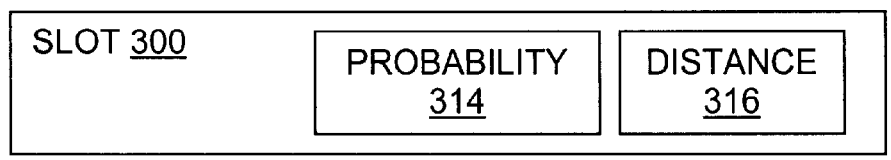
FIG. 15 is a diagram illustrating the components of the slot data structures shown in FIG. 14.

FIG. 15 illustrates the data associated with each slot 300. Each slot includes a probability value 314. The probability value 314 of a slot is a single value that represents the likelihood that the vehicle is located anywhere along the slot length. The probability 314 may be defined using an n-bit number. In one embodiment, n is equal to 32. In FIGS. 12A, 12B, and 13, the probability of each slot is graphically represented by its height.

Referring again to FIG. 15, associated with each slot is location data 316. The location data 316 identifies the location of the slot. According to one embodiment, the location of the slot is defined as the distance of the slot from the left node of the segment upon which the slot is located. The distance from the left node is measured from the tail end of the slot. The tail end of a slot is defined with respect to the direction of travel. FIGS. 12A and 12B illustrate the tail ends of the slots for each direction of travel.

Referring again to FIG. 14, the segments that have slot lists associated with them form a candidate pool 225. The candidate pool 225 is formed by the positioning layer programming 264 and includes all the segments that have slots associated with them. During operation, the positioning layer programming adds segments to and removes segments from the candidate pool 225, as described below.

B. Operation (1). Shifting of Slots

As stated above, when requested for an updated vehicle position, the positioning layer 264 shifts the prior position density by the distance traveled (as measured by the speed pulse sensor 276, odometer, or other device), taking into account the error in the measurement of the distance traveled. This process is illustrated in connection with FIGS. 16 and 17. The positioning layer 264 implements the shifting of the prior position density by moving the slots along the road segments to which they are associated by the measured distance traveled. (Of course, this is a figurative description. The slots are data structures implemented in the positioning layer software. "Moving" the slots represents adjusting the positions (distance 316 in FIG. 15) along the road segments at which the probabilities (314 in FIG. 13) of the vehicle position are located.)

Figure 16:
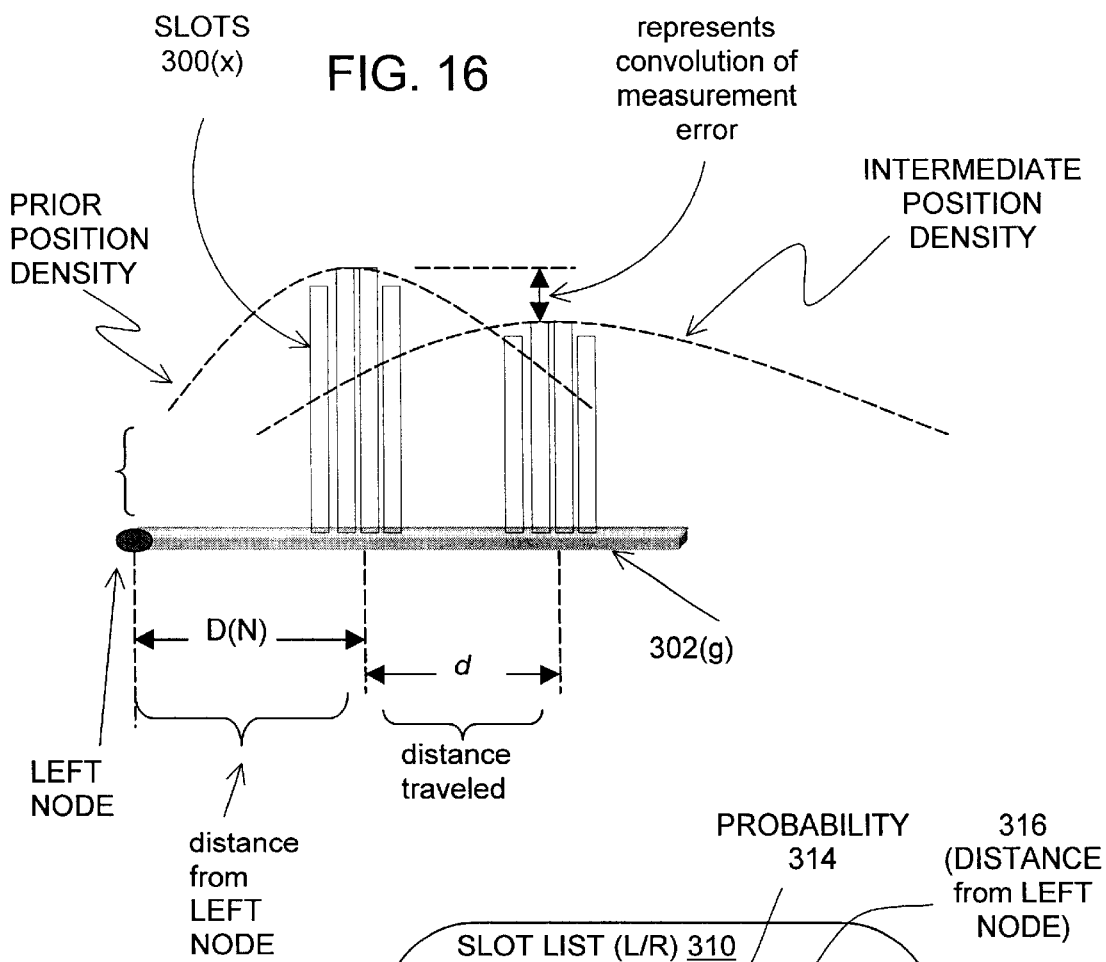
FIG. 16 is a graphical depiction that illustrates the step of updating a prior position density to determine an intermediate position density along a road segment which is performed by the positioning layer of FIG. 4.

FIG. 16 shows four slots 300(x) corresponding to the prior position density located at first positions along the segment 302(g). One of these four slots 300(x) is located at a distance, D(N), from the left node of the segment 302(g). FIG. 16 also shows these four slots 300(x) shifted along the segment 302(g) by a distance, d, to an intermediate, or second, position. This new position is labeled the intermediate position density. The distance, d, corresponds to the distance traveled, as measured by the speed pulse sensor 276 (in FIG. 4), odometer, or other device. Each of the slots 300(x) is shifted by the same distance, d, so that the slots remain in an end-to-end relationship with each other.

Figure 17:
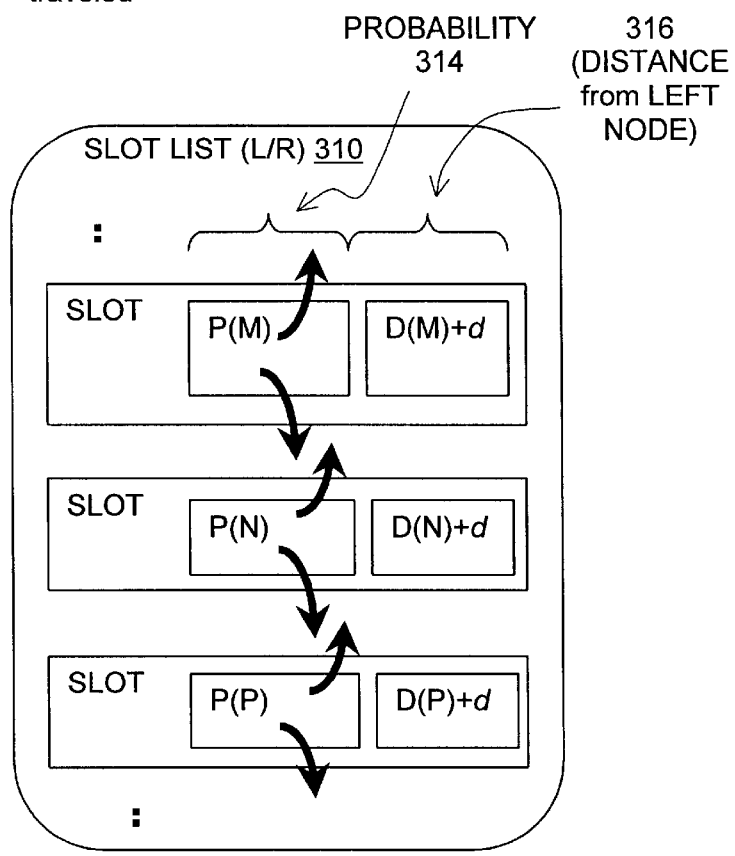
FIG. 17 is a block diagram showing one of the slot lists in FIG. 14 graphically illustrating the process of updating a prior position density to determine an intermediate position density along a road segment as shown in FIG. 16.

Referring to FIG. 17, the positioning layer 264 effects shifting of the slots 300 by adding the measured distance traveled, d, to the location data field 316 in the data structure defined for each slot. As mentioned above, the location data field 316 contains the distance of the slot from the left node of the segment with which it is associated. Thus, if the direction of travel is positive (left-to-right) with respect to the segment, the distance is a positive number and the slots are shifted away from the left node toward the right node, as illustrated in FIG. 17. Conversely, if the direction of travel is negative, the distance, d, is negative which shifts the slots toward the left node and away from the right node.

As noted above, the shifting of the locations of the slots represents the shifting of the position density. This shifting of slots will cause some slots to move from one road segment to another. If the distance traveled is large enough to shift a slot entirely past the node at an end of a road segment, the slot is relocated onto the successor road segment, if any. When this occurs, the slot is taken off the slot list associated with the prior road segment and added to the slot list of the successor road segment. When the slot is relocated onto a successor segment, the data indicating the distance of the slot from the left node (316 in FIG. 15) is adjusted to reflect the new position of the slot on the new road segment. If there is more than one successor road segment at a node, the slot is copied onto each of the successor road segments, i.e., the slot is added to the slot list associated with each of the successor road segments. In addition to the successor road segments leading away from a road segment that leads into a node, a road segment is also treated as its own successor. Thus, slots shifting past the end of a road segment are reflected in an opposite direction back onto the segment from which they were leaving. Thus, a slot may be taken off the slot list associated with a segment for one direction of travel and be placed on the slot list of the same segment for the other direction of travel. This allows U-turns to be modeled as reversing the direction of slots If the successor segment onto which a slot is shifted is not already in the candidate pool (225 in FIG. 14), it is added to the candidate pool at this time. If necessary, the positioning layer programming retrieves the data entity representing the successor road segment from the geographic database (141 in FIG. 1). Thus, according to one method of operation of the positioning layer programming, road segments are added to the candidate pool when one or more slots are shifted onto them. According to this method of operation of the positioning layer programming, slots are not shifted onto nearby road segments that physically do not connect to those road segments upon which slots are located in the prior iteration. For example, a vehicle may be traveling along a portion of a controlled access road that has no exit ramps but which is crossed by other roads by means of overpasses or underpasses. The vehicle position on the controlled access road segments is represented by slots representing a position density. Under these circumstances, the road segments that represent the physically inaccessible overpasses and underpasses would receive no slots during the shifting step because these road segments are not successors of (i.e., there are no paths from) the controlled access road segments that have slots in the prior step. The inaccessible road segments are not added to the candidate pool and no position density (e.g., slot lists) is associated with them.

(2). Transfer Elements

In the disclosed embodiment of the positioning layer, each slot is required to be located entirely on a segment, i.e., a slot cannot straddle a node. The positioning layer programming provides another means to account for the position density between the leading edge of the leading slot along a road segment and the trailing edge of the first slot on the successor segment. A transfer element is a data structure used for this purpose. A transfer element is a data structure used to represent a slot leaving one road segment and entering one successor road segment. During the step of forming the intermediate position density, if the shifting of a slot by the distance traveled causes the slot to be relocated so that it straddles a node, the slot is replaced with one or more transfer elements.

Figure 18:
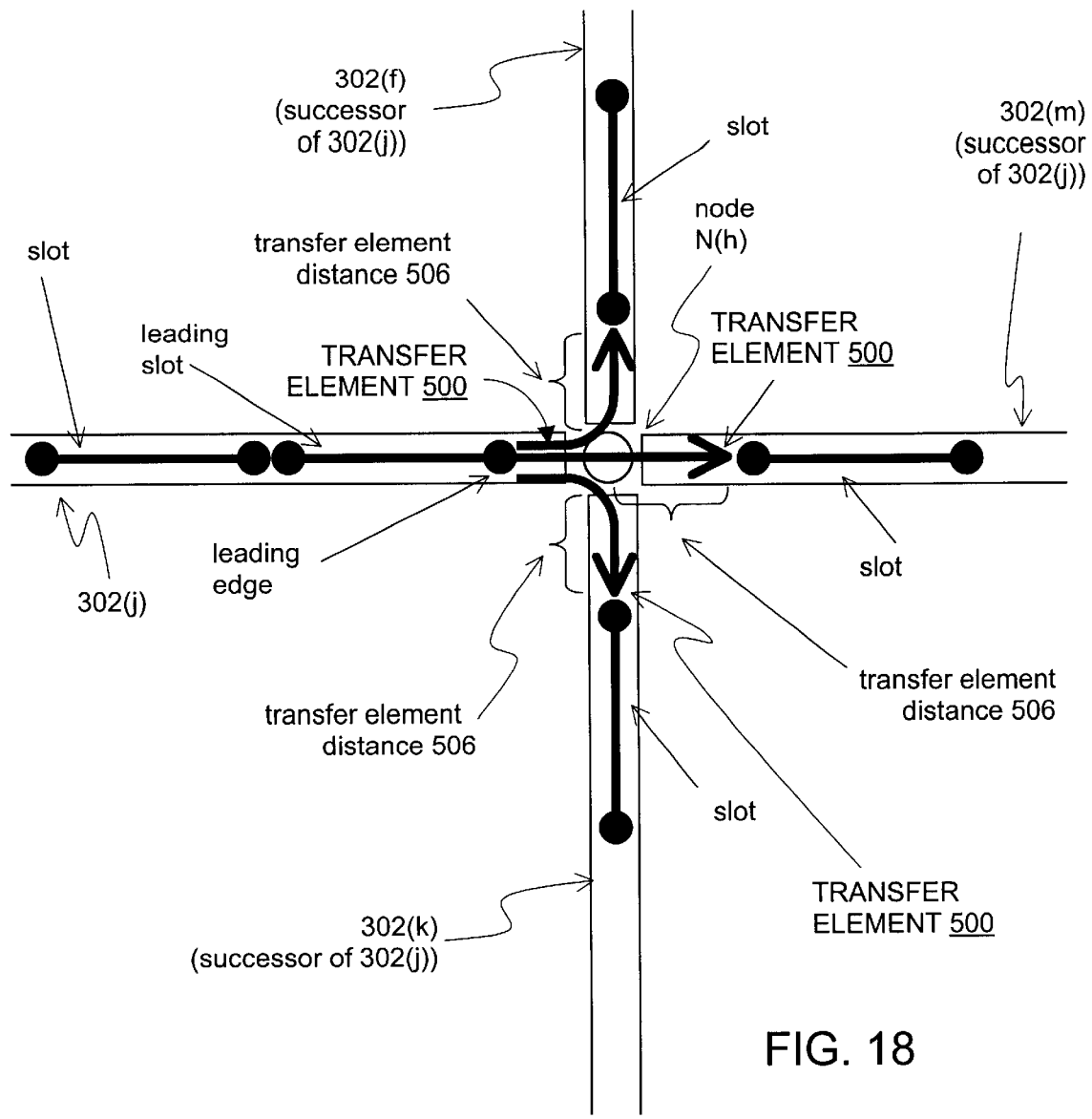
FIG. 18 is a graphical illustration of several transfer elements used to represent a position density across a node according to the embodiment of the positioning layer implemented using step functions described in connection with FIGS. 12A–17.
Figure 19:
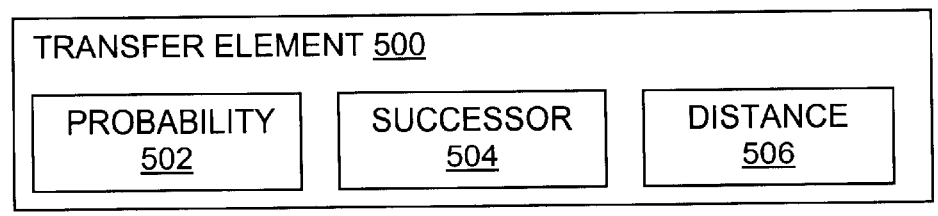
FIG. 19 is a block diagram showing the components of a transfer element data structure used by the embodiment of the positioning layer implemented using step functions described in connection with FIGS. 10A–17.

FIG. 18 graphically illustrates transfer elements formed to represent the position density across a node, N(h). FIG. 19 is a diagram illustrating the components of a transfer element 500. Each transfer element 500 includes data 502 indicating a probability, data 504 identifying the successor segment, and data 506 indicating a distance. The probability 502 of a transfer element represents the position density at the location of the transfer element. The probability 502 of a transfer element is similar to the probability of a slot and is treated in a similar manner. The data 504 identifying the successor road segment may include any suitable means of identification, such as the entity ID (222(1) in FIG. 2) of the road segment data entity (222 in FIG. 2) that represents the successor road segment. The distance data 506 of a transfer element represents the distance into the successor road segment that the transfer element is considered to extend. This distance is measured from the node to which the transfer element is associated into the successor segment. The distance corresponds to how far a slot that straddled the node would extend into the successor segment if slots were not required to be located entirely on a segment.

The positioning layer forms one transfer element for each successor road segment at a node. (As mentioned above, the positioning layer also treats the segment from which a slot originates as its own successor.) Thus, if, at a given node, there are three successor road segments of a first road segment, the positioning layer forms four transfer elements—one for each successor road segment including the originating segment. FIG. 18 graphically illustrates three transfer elements 500 formed to represent the transition of the position density from the segment 302(j) onto three successor road segments, 302(f), 302(m), and 302(k).

In order to manage the transfer elements, the positioning layer forms transfer element lists. Referring to FIG. 14, transfer element lists 510 are associated with segments included in the candidate pool 225. A transfer element list 510 identifies and manages all the transfer elements associated with one of the nodes of the segment to which the transfer element list is associated in one direction. Thus, a segment can have two transfer element lists associated with it—one for the transfer elements leading out of one node of the segment in one direction and the other for the transfer elements leading out of the other node of the segment in the other direction. These lists 510 are maintained and updated to account for the shifting of the position densities in a similar manner as the slot lists 310.

It is possible that slots shifting across a node can originate from more than one direction. This can occur if more than one road segment leading into a node has slots located thereupon. For example, in FIG. 18, the successors of the originating road segment 302(f) include the road segments 302(j), 302(m), and 302(k) (as well as the originating road segment 302(f)). The successors of the originating road segment 302(m) include the road segments 302(j), 302(f), and 302(k) (as well as the originating road segment 302(m)). If transfer elements are associated with each of these originating segments, transfer element lists are formed and associated with each of these originating segments.

The transfer elements are treated similarly to slots. When forming intermediate position densities, the transfer elements lose probability to, and gain probability from, their neighbors. The neighbors of a transfer element are the last slot on the segment to which the transfer element is associated and the first slot(s) on each of the successor segments.

(3). Convolution

As mentioned above, the positioning layer uses a convolution operation to take into account the error in measuring the distance traveled. In the embodiment of the positioning layer described above, this convolution operation is approximated by causing each slot to lose a percentage of the value of its probability to its neighboring slots when the slots are moved by the distance traveled from the prior position to the intermediate position. In one embodiment, the percentage of the probability value that the slots lose due to the convolution approximation operation is configurable. The percentage selected for the convolution approximation operation is related to the error in the measurement of the distance traveled. Thus, if the measurement of the distance traveled is subject to a large degree of error, a relatively high percentage is used. If the measurement is subject to a small error, a relatively small percentage is used. As mentioned above, the positioning layer receives data (288 in FIG. 4) that includes a measurement of the distance traveled and an indication of the error in the measurement.

With respect to the speed pulse sensor (or odometer), the reported error may be consistent over long periods of time, or may vary due to various conditions. For example, if the speed pulse sensor is based upon wheel speed and the vehicle is traveling on wet or icy roads (as detected by another sensor) where the wheel may have poor traction, the measurement error of the speed pulse sensor be greater than when the vehicle is traveling on dry pavement. Also, tire wear can affect the speed pulse sensor measurements. Further, the speed pulse measurements can also be affected by deflation and inflation of the tires caused by various factors including normal temperature changes due to road friction.

Half the loss of probability value of each slot is added to each of the slot's right and left neighboring slots. Thus, since each slot loses probability value to its neighboring slots, each slot also receives some portion of probability value from its neighbors. However, since the same percentage of loss is applied to all the slots, those slots with greater probability values lose more to their neighbors than the slots with lesser probability values.

This implementation of the convolution approximation by the positioning layer 264 is illustrated in FIGS. 16 and 17. In FIG. 16, the slots 300 in the intermediate position density are shown to have lesser heights than they did in the prior position density, indicating that they have lost probability value to their neighboring slots. FIG. 16 also shows that the intermediate density position is flattened out relative to the prior density position. As illustrated in FIG. 17, the convolution approximation is implemented by adding half of the calculated probability loss for each slot to the slot's neighbors.

(4). Updating Probability

After the convolution of the prior position density by the distance traveled, the sensor-derived data is applied to the shifted prior position density. (As mentioned above, the sensor-derived data may be obtained directly from the sensors or the device independent layer, or the sensor-derived data may be obtained from the fusion layer in which case the sensor-derived data represents a fusion of all the sensor data.)

As mentioned above, the positioning layer obtains data from the fusion layer. These data are used as three metrics to modify the probability of each shifted slot. (The sensor-derived data decreases the probability associated with each slot since each density function is normalized to have a maximum value of "1.") The three types of data obtained from the fusion layer include heading, position, and curvature history (i.e., change of heading as a function of distance). Each of these three types of data is compared to the heading, position, and curvature history associated with each slot. To the extent that a slot's data do not match the data from the fusion layer, the slot's probability is decreased correspondingly.

With respect to heading and position, the fusion layer provides data indicating these types of data. As an example, the fusion layer may indicate the vehicle heading as 125 degrees. If a slot has a heading other than 125 degrees, the probability of the slot is decreased by a corresponding amount. Likewise, the fusion layer may report the vehicle position as x degrees latitude and y degrees longitude. A slot's probability is reduced by an amount that corresponds to its distance from the position reported by the fusion layer.

(5). Using Curvature History (Change of Heading)

As mentioned above, the positioning layer uses curvature history (i.e., change of heading as a function of distance) in addition to heading and position to determine the vehicle's position along the road. In the embodiment described herein, the positioning layer applies data indicating the change of heading as a function of distance to the slots so that the change of heading is implemented as a step function. Referring again to FIGS. 12A and 12B, if the midpoint of a slot on the digitized road geometry is used, then the metric comparing $\Theta^{measured}(0)-\Theta^{measured}(S)$ to $\Theta^{map}(0)-\Theta^{map}(S)$ can be used to adjust the probability of a slot. For example, the probability of a slot can be multiplied by a factor, which is determined from Equation (9), above. (A midpoint of a slot is an arbitrarily selected position on the slot. It may be preferable to convolve $\Theta^{map}(0)-\Theta^{map}(S)$ with a unit function supported by the slot width before computing the probability of the slot.)

Figure 20B:
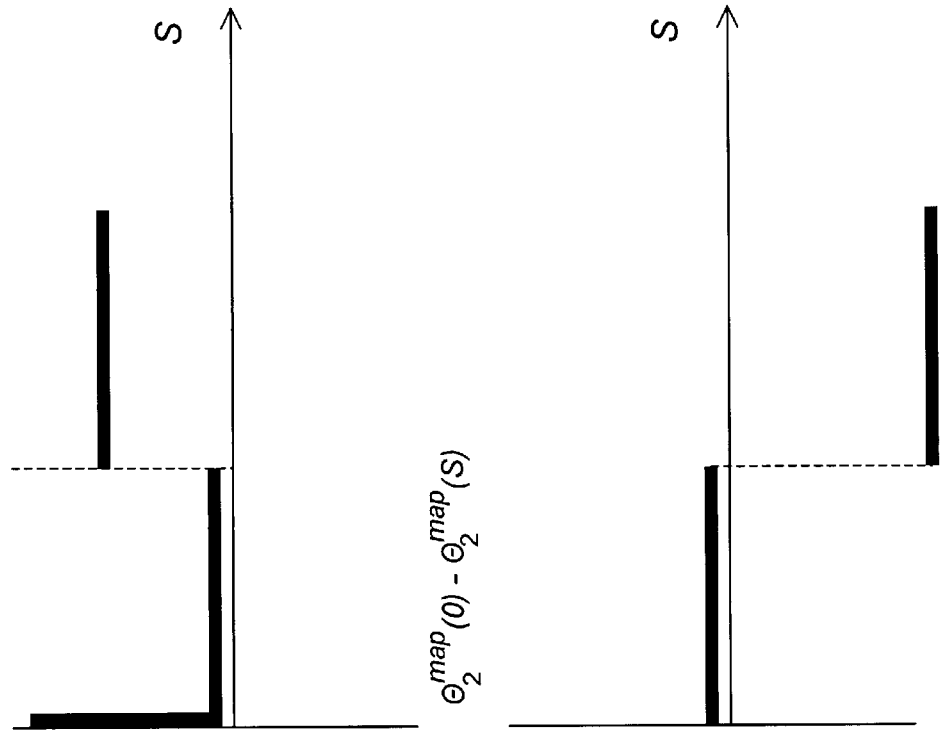
FIG. 20B is a graph of the change of heading measured at points along the road geometry shown in FIG. 20A.
Figure 20A:
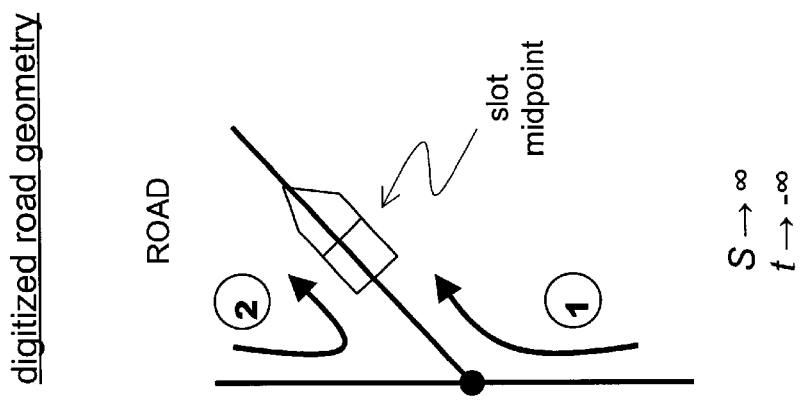
FIG. 20A illustrates an intersection represented by the geographic data used by the navigation system of FIG. 1.

If backwards traversal from the midpoint of the slot over the distance $S_1$ in the digitized road geometry passes through a node, then the metric is the minimum of values as computed from Equation (9), above, over all possible paths through the digitized road network. FIGS. 20A and 20B illustrate this aspect.

After the sensor-derived data is applied to the shifted prior position density, the candidate pool of segments is redetermined. This is done to minimize the number of slots (and transfer elements) for which updated probabilities are calculated. When redetermining the candidate pool, the first step is to remove slots that have a low probability. The probabilities of all the slots are evaluated and any slot with a probability below a minimum probability threshold for slots is discarded. The minimum probability threshold for slots is configurable and may be selected depending upon the resources of the computing platform. A slot with a probability below the minimum probability threshold for slots can be discarded since the low probability indicates that the vehicle is not likely to be located at the position of the slot. Other alternative means may be used to reduce the number of slots to evaluate. For example, only a fixed number of slots may be evaluated (i.e., those 25 slots with the highest probabilities) and the remainder discarded.

After discarding the slots that have low probabilities, the probabilities of all the segments in the candidate pool are evaluated. The probability of a segment is composed of the sum of the probabilities of all the slots associated with the segment after the slots with low probabilities are discarded plus the sum of the proportionate probabilities of the transfer elements associated with the segment. (The proportionate probability of a transfer element associated with a segment is that portion of the entire probability of a transfer element corresponding to the respective portion of the entire length of the transfer element associated with the segment.) The minimum probability threshold for segments is configurable and may be selected depending upon the resources of the computing platform. If the probability of a segment is below the minimum probability threshold for segments, the segment is removed from the candidate pool. When the segment is removed from the candidate pool, any slots located on the segment are also discarded. These slots can be eliminated because if the total probability of a segment is low, the vehicle is not likely to be on any of the slots located on the segment.

After the segments in the candidate pool are redetermined, a new final position density is determined. The slot with the greatest probability value is identified. Once the slot with the greatest probability is identified, the vehicle position along the slot can be determined.

According to one embodiment, the positioning layer programming takes into account the underlying road geometry when determining the position of the vehicle along the slot. If the slot is located along a straight portion of a road segment, the vehicle position is determined to be at the midpoint of the slot. (This position can be determined from the distance along the associated road segment from the left node thereof using the location data 316 of the slot, plus one-half the slot length, e.g., 512 centimeters, for direction of travel from left end to right end of the segment.) If the slot is located along a portion of a road that is other-than-straight, the slot is divided into a plurality of sub-slots based upon the other-than-straight road geometry. As mentioned above, if a road segment is other-than-straight, it can be represented in the geographic database using shape points (labeled 223(3) in FIG. 2 and described in connection therewith). A shape point defines the geographic coordinates of a point located along the road segment between its endpoints. Shape points are used to approximate the actual other-than-straight road geometry by representing the road segment as a series of straight links connected to each other at the shape points. When the slot with the highest probability is located along a segment so that it overlaps one or more shape points of the segment, the slot is divided into two or more sub-slots at the location(s) corresponding to the shape points that are overlapped. Then, the probability of the slot is distributed to each of these sub-slots based upon their relative sizes, taking into account the heading or other sensor-derived data. For example, if the slot overlaps two shape points, the slot is divided into three sub-slots. Each of these sub-slots may have a different heading. The sensor-derived data is applied to each of these sub-slots separately. The sensor-derived heading reading may significantly favor one of these sub-slots relative to the others. Based upon application of the sensor-derived data to the sub-slots, a probability is associated with each sub-slot. Then, the midpoint of the sub-slot with the highest probability is determined as the vehicle position.

This position determined by the positioning layer as the vehicle position is reported to the calling application.

(6). Turn Detection Correction Feature

As mentioned above in connection with FIG. 5, the positioning layer may provide feedback to the fusion layer if the computed certainty of the positioning layer 264 output is high (Step 404 in FIG. 5). This feedback can be used to adjust the processed results from the sensor readings. Some of the sensors used to obtain vehicle position information, such as the gyroscope 274 and speed pulse sensor 276 in FIG. 4, produce outputs that have some degree of error or uncertainty. Unless corrected on a regular basis, this error or uncertainty can accumulate and provide incorrect results over time.

According to one embodiment, after the position of the vehicle relative to the road network is determined with a relatively high degree of confidence using the process described above in connection with the positioning layer, the information about the vehicle position on the road network is used to adjust the processed results from the sensor data. The vehicle position determined by the positioning layer can be used this way because the position of the road is known with a relatively high degree of certainty from the geographic database (141 in FIG. 1). Thus, the data indicating the positions of the roads in the geographic database 141 and the data indicating a position of the vehicle on the roads can be used in as a feedback mechanism to adjust the processed results from the sensor readings to prevent errors from accumulating in the results.

Figure 21:
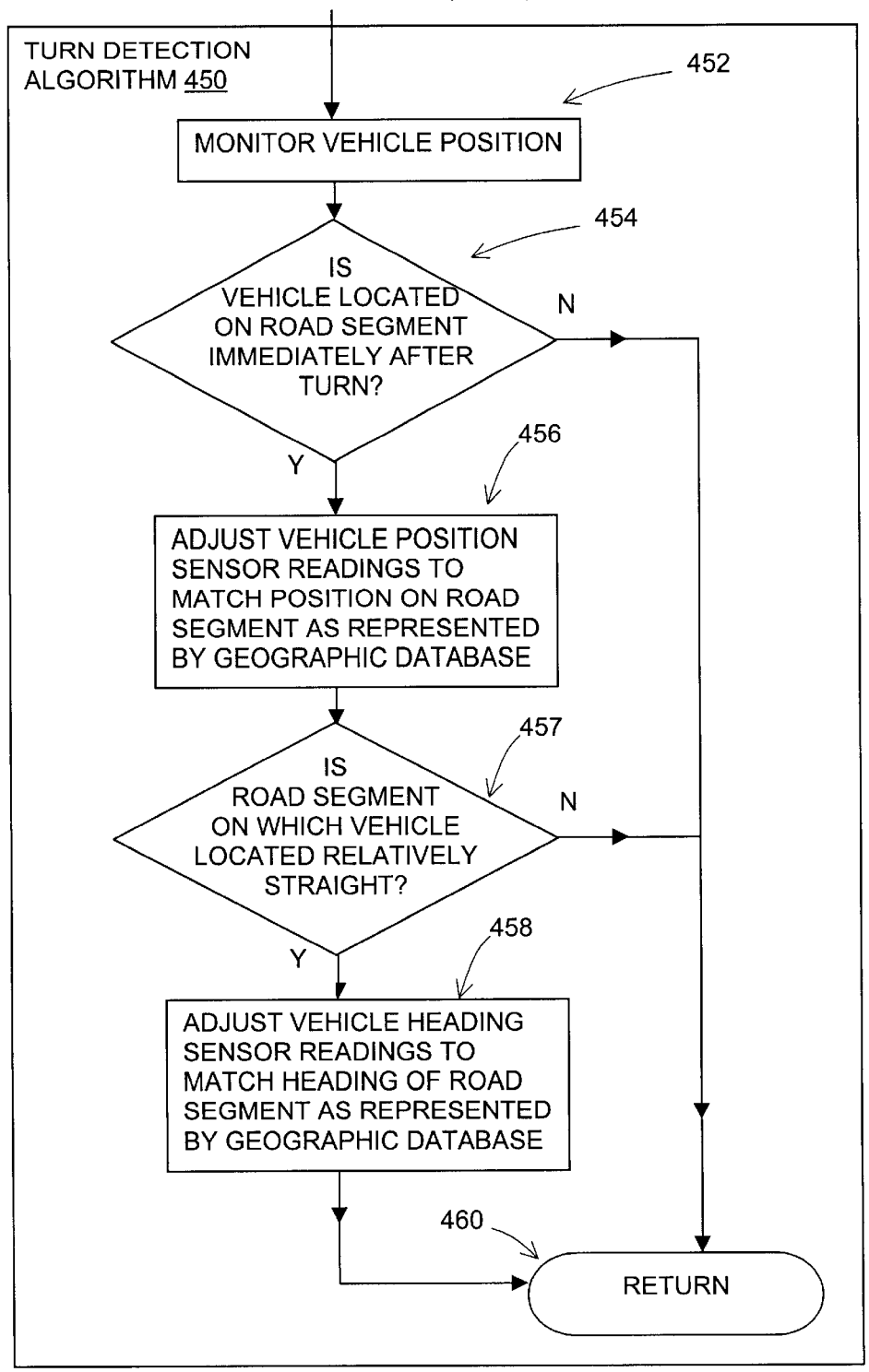
FIG. 21 is a flowchart describing operation of a turn detection algorithm used in connection with the process shown in FIG. 5.

When using the calculated vehicle position as a feedback mechanism to correct the processed results from the sensor data readings, it is preferable that the vehicle position be known with a relatively high degree certainty. Accordingly, a turn detection algorithm 450 is used. A flowchart showing the steps in the turn detection algorithm 450 is shown in FIG. 21. The turn detection algorithm 450 monitors the vehicle position relative to the data in the geographic database (Step 452 in FIG. 21). The turn detection algorithm 450 detects when the vehicle has just completed a turn (Step 454 in FIG. 21). When the position reported by the positioning layer indicates that the vehicle is located on the road network and the vehicle has just completed a turn, the vehicle position with respect to the road network should be known with a relatively high degree of certainty. At this point, the position of the vehicle, as determined by the positioning layer, is used to correct the processed results from the sensor data readings that are produced by the fusion layer (Step 456 in FIG. 21). As an example, the position of the vehicle determined by the positioning layer is used to correct the processed data value representing the vehicle position which is derived from the gyroscope and the speed pulse sensor.

According to a further aspect of the turn detection algorithm 450, when the vehicle position with respect to the road network has been determined with a relatively high degree of certainty, the sensor data indicating the vehicle heading can also be adjusted. When the position reported by the positioning layer indicates that the vehicle is located on the road network and the vehicle has just completed a turn and the vehicle is located on a road segment that is straight, the vehicle heading with respect to the road network should be known with a relatively high degree of certainty. (For purposes of this disclosure, a road segment is considered to be "straight" if the data entity that represents the road segment includes no shape points.) Accordingly, when the vehicle has just completed a turn and is located on a straight road segment, the heading of the road segment is used to correct the sensor-data derived vehicle heading (Steps 457 and 458 in FIG. 21).

After the turn detection algorithm 450 has been used to correct the sensor data indicating the vehicle position and possibly also the vehicle heading, the turn detection algorithm returns to the calling program (Step 460 in FIG. 21).

(7). Search Region

As mentioned above, the positioning layer programming determines a vehicle status which may be "on road," "off road," or "unknown." When the vehicle is "on road," the prior position densities ("slots") are shifted to form intermediate position densities and then the sensor-derived data are applied to determine a final position density from which the vehicle position is determined, in the manner described above. If the vehicle status is "off road" or "unknown," the prior position density is considered to be unreliable. If the vehicle status is "off road" or "unknown," a new position density is determined.

As mentioned above, a search region is used to determine a new position density. This search region is determined using appropriate data from the sensor equipment (125 in FIG. 1). For example, if the sensor equipment includes a GPS system (e.g., 272 in FIG. 4), the data output of the GPS system can be used to determine or estimate a geographic position together with an estimation of the measurement error. Alternatively, dead-reckoning or a combination of dead-reckoning and GPS can be used to estimate such a geographic position and to estimate the measurement error associated therewith. The positioning layer 264 retrieves from the fusion layer 262 (or other underlying layer) the geographic position estimate together with a covariance matrix used to describe the measurement or estimation error. Since the position measurement is assumed to be bivariate-normal, contours of equal probability take the shape of ellipses. Using the covariance matrix, a confidence region of any defined size can be calculated around the measured or estimated position. As stated above, in one embodiment, a confidence region of 95% is determined. A confidence region of 95% is the area within the support region of the position density function such that the probability of the true position of the vehicle in this area is 0.95.

Figure 22:
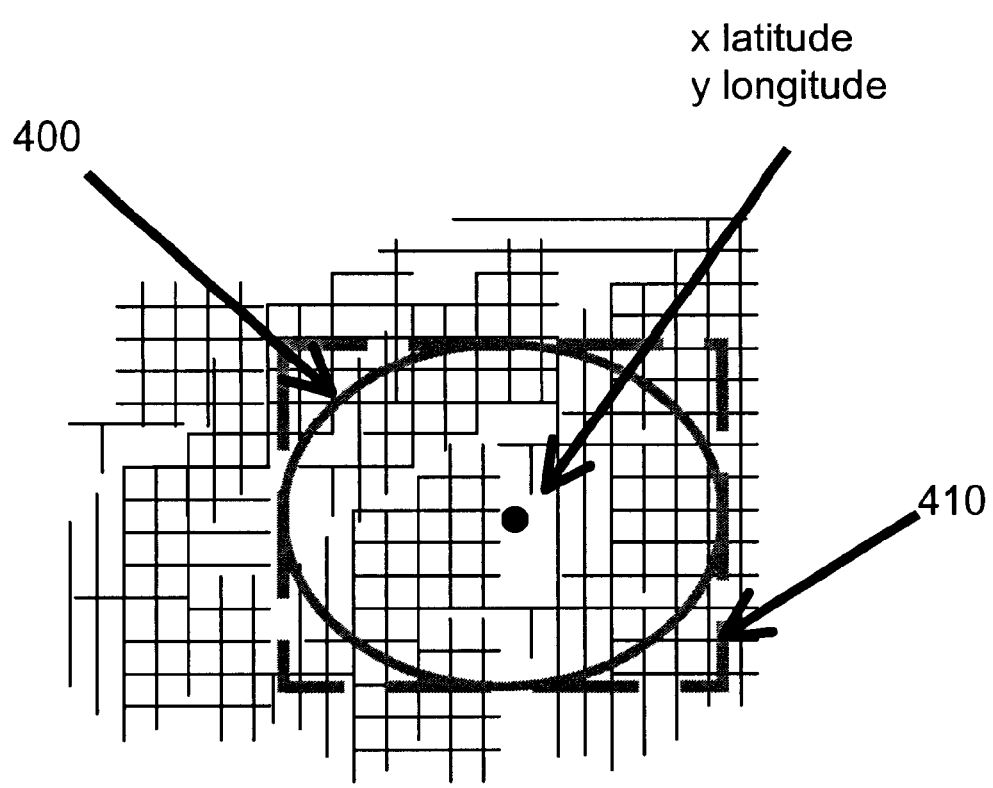
FIG. 22 is a map of a portion of a geographic region graphically illustrating the process performed at initialization of the embodiment of the positioning layer implemented using step functions described in connection with FIGS. 12A–20.

FIG. 22 illustrates a confidence region 400 defined around returned geographic coordinates, x latitude, y longitude. As shown in FIG. 22, the confidence region 400 may be a region around the returned geographic coordinates.

The positioning layer 264 determines a minimum bounding rectangle 410 of this confidence region as a search region. The minimum bounding rectangle is the smallest rectangle area that encompasses the confidence region 400. In alternative embodiments, a larger or smaller confidence region may be used, which in turn would result in a correspondingly larger or smaller search region.

The road segments in the new search region 410 can be identified using the geographic database 141 and/or appropriate programming functions such as those included in the interface layer (213 in FIG. 3). The road segment data entities (222 in FIG. 2) in the geographic database 141 include data attributes that provide for identification of the data entity (and therefore the represented road segment) by the geographic coordinates of the road segment. Using the coordinates of the boundaries of the search region, the data entities that represent the road segments encompassed within the search region are identified. The data entities may be obtained from the geographic database, if necessary. All the road segments located within the confidence region 400 (or the search region 410) are added to the segments already in the candidate pool, if any, from the prior iteration of the position layer function.

Figure 23:
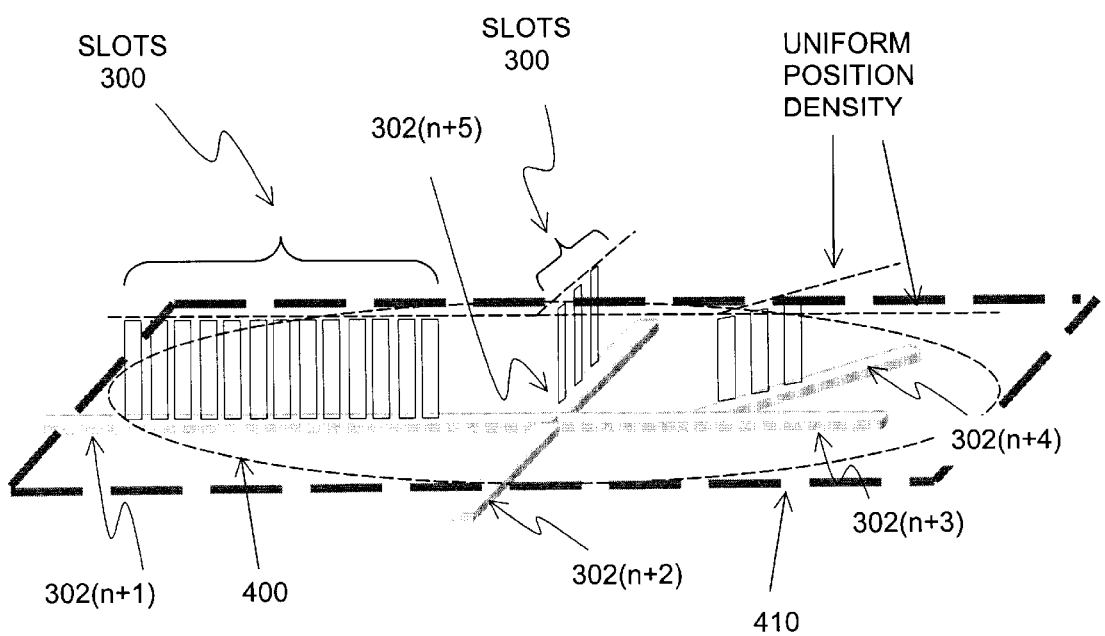
FIG. 23 is an illustration similar to FIG. 13 showing the position density along several road segments at the initialization process described in connection with FIG. 23.

Once the positioning layer programming 262 obtains all the data entities that represent road segments in the confidence region 400, a uniform density is determined along the portions of these segments which lie inside the confidence region. This is done by padding these portions of the segments with slots with a fixed, configurable padding probability. This is illustrated graphically in FIG. 23. FIG. 23 is an illustration of the road segments 302(n+1), 302(n+2) . . . within a confidence region and a search region. As shown in FIG. 22, all the slots 300 within the confidence region have the same height, i.e., have the same value for the position density. Likewise, transfer elements having the uniform position density are added, as needed, within the confidence region. As mentioned above, if a prior position density is available, but unreliable (because the vehicle status was determined to be "unknown" or "off-road"), the prior position density can be used in combination with the new uniform position density. For example, the probability of each slot or transfer element associated with a segment already in the candidate pool (before the segments in the search region 410 are added) and that has a probability less than the uniform padding probability is adjusted to equal the uniform padding probability assigned to the new slots added to segments within the search region. Any slot or transfer element associated with a segment already in the candidate pool that has a probability greater than the uniform padding probability retains its higher probability.

(8). Initialization

When the vehicle is first turned on, the navigation system performs an initialization procedure. When the vehicle is first turned on, the positioning layer may not have a prior position density to update. If this is the case, the positioning programming layer defines the vehicle status as "unknown." Then, the positioning programming layer uses a search region, in the manner described above, to determine a vehicle position.

In an alternative embodiment, the positioning layer 264 can use a prior position density at start up in the same manner as it does during normal operation. This may be implemented by providing that the positioning layer 264 save the slot lists that define the last position density determined when the vehicle is shut down. This data may be stored in a non-volatile memory in the navigation system. Later, when the vehicle is started up, the prior position density is shifted by the distance traveled and the new sensor readings are applied to the shifted position density. The distance traveled may be zero if the vehicle has not been moved (as indicated by the odometer or speed pulse sensor) since it was shut off. Under these circumstances, new vehicle position (at start up) is the same as the prior vehicle position (at shut down).

VII. Alternatives

In the embodiments disclosed above, a vehicle position was determined relative to data in a geographic data. The vehicle may be a car, truck, bus, motorcycle, or any other kind of vehicle that can travel along roads. The concepts embodied in the disclosed methods can be applied to other modes of travel, such as travel by foot (i.e., pedestrian), rail, bicycle, mass transit, horse-drawn, and so on. With different modes of travel, there would be several considerations. For example, in an embodiment of the position determining program and method used for a bicycle, a geographic database would be used that included data that represented features that were navigable by bicycle, including bicycle paths as well as roads upon which motorized vehicle travel. (Controlled access roads may be included, but consideration of such roads would be suppressed by reducing the probability associated therewith.) In an embodiment used for travel by foot, the geographic database would include pedestrian paths and walkways. In an embodiment used for travel by foot, an appropriate sensor to measure the distance walked would be used.

As stated above, one way to represent the position density along the road network is to use step functions. In alternative embodiments, the position density can be computed as a continuous value along the road network instead of a collection of discrete values.

As mentioned above, an embodiment of the vehicle positioning program is used in a navigation system that is similar to the system described in Ser. No. 09/276,377. However, the vehicle positioning programming disclosed in the present specification is not limited to use only in a system like the one described in Ser. No. 09/276,377.

It is intended that the foregoing detailed description be regarded as illustrative rather than limiting and that it is understood that the following claims including all equivalents are intended to define the scope of the invention.

We claim:

1. A method of determining a position of a vehicle relative to a road network formed by road segments represented by a geographic database, the method comprising the steps of:

determining an intermediate position density along a plurality of road segments in the road network by shifting a prior position density which had been determined along said plurality of road segments by a distance traveled by the vehicle since the prior position density had been determined;

modifying said intermediate position density to take into account sensor data received since the prior position density had been determined to form a second position density wherein the sensor data includes
  (a) data indicating a position of the vehicle,
  (b) data indicating a heading of the vehicle, and
  (c) data indicating a change of heading of the vehicle as a function of distance traveled; and determining the position of the vehicle to be that location along the plurality of road segments at which the second position density is greatest.

2. The method of claim 1 wherein the change of heading comprises a curvature history.

3. The method of claim 1 wherein the heading change is measured by a sensor that measures angular velocity.

4. The method of claim 3 wherein the sensor that measures angular velocity comprises a gyroscope.

5. The method of claim 1 further comprising:
if the position of the vehicle indicates that the vehicle has just completed a turn, adjusting subsequent sensor data indicating a position of the vehicle to correspond to a position along the road network as represented by the geographic database.

6. The method of claim 5 further comprising:
if the position of the vehicle indicates that the vehicle has just completed a turn and is located on a straight road segment, adjusting subsequent sensor data indicating a heading of the vehicle to correspond to a heading of the straight road segment upon which the vehicle has been determined to be located.

7. The method of claim 1 further comprising:
if the position of the vehicle indicates that the vehicle has just completed a turn and is located on a straight road segment, adjusting subsequent sensor data indicating a heading of the vehicle to correspond to a heading of the straight road segment upon which the vehicle has been determined to be located.

8. The method of claim 1 wherein said position densities are represented by step functions.

9. The method of claim 8 wherein said step functions are represented by slots shiftable along said road segments.

10. A program that determines a position of a vehicle relative to data that represent navigable roads in a geographic region, the program comprising:

a first routine that forms an intermediate position density by shifting a prior-determined position density associated with a plurality of said navigable roads represented by said data by a distance traveled since said prior-determined position density was determined, wherein said prior-determined position density represents a probability that the vehicle was located along said plurality of navigable roads at a time to which said prior-determined position density related;

a second routine that modifies said intermediate position density using sensor data obtained since said prior-determined position density was determined to form a new position density, wherein the sensor data includes
  (a) data indicating a position of the vehicle,
  (b) data indicating a heading of the vehicle, and
  (c) data indicating a change of heading of the vehicle; and a third routine that determines the position of the vehicle to be that location along said plurality of roads at which said new position density is greatest.

11. The invention of claim 10 wherein the heading change is a rate of change of heading preceding a certain instant over a distance.

12. The invention of claim 10 wherein the heading change is measured by a sensor that measures angular velocity.

13. The invention of claim 12 wherein the sensor that measures angular velocity comprises a gyroscope.

14. The invention of claim 10 further comprising:
a fourth routine that adjusts subsequent sensor data that indicate a position of the vehicle to correspond to a position along the road network as represented by the geographic database if the position of the vehicle determined by the third routine indicates that the vehicle has just completed a turn.

15. The invention of claim 14 wherein the fourth routine further adjusts subsequent data that indicates a heading of the vehicle to correspond to a heading of a straight road segment upon which the vehicle has been determined to be located if the position of the vehicle determined by the third routine indicates that the vehicle has just completed a turn and is located on a straight road segment.

16. The invention of claim 10 further comprising:
a fourth routine that adjusts subsequent data that indicates a heading of the vehicle to correspond to a heading of a straight road segment upon which the vehicle has been determined to be located if the position of the vehicle determined by the third routine indicates that the vehicle has just completed a turn and is located on a straight road segment.

17. The invention of claim 10 wherein said first, second, and third routines are stored on a computer-readable medium.

18. The invention of claim 10 wherein said program is installed in a navigation system installed in said vehicle.

19. A method of determining a position of a vehicle relative to a road network formed by road segments represented by a geographic database, the method comprising the steps of:

determining an intermediate position density along a plurality of road segments in the road network by shifting a prior position density which had been determined along said plurality of road segments by a distance traveled by the vehicle since the prior position density had been determined;

modifying said intermediate position density to take into account sensor data received since the prior position density had been determined to form a second position density;

determining the position of the vehicle to be that location along the plurality of road segments at which the second position density is greatest; and if the vehicle has just completed a turn, adjusting subsequent data indicating a position of the vehicle to correspond to a position along the road network as represented by the geographic database.

20. The method of claim 19 further comprising:

if the vehicle has just completed a turn and is located on a straight road segment, adjusting subsequent sensor data indicating a heading of the vehicle to correspond to a heading of the straight road segment upon which the vehicle is located.

* * * * *